US010721404B1

(12) United States Patent
Battocchi et al.

(10) Patent No.: US 10,721,404 B1
(45) Date of Patent: Jul. 21, 2020

(54) CONFIGURING IMAGING DEVICES BASED ON CONTROL SIGNALS

(71) Applicant: Amazon Technologies, Inc., Seattle, WA (US)

(72) Inventors: Scott Battocchi, Seattle, WA (US); Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 10 days.

(21) Appl. No.: 16/116,621

(22) Filed: Aug. 29, 2018

(51) Int. Cl.
*H04N 5/232* (2006.01)
*B64C 39/02* (2006.01)
*G05D 1/08* (2006.01)
*G05D 1/06* (2006.01)

(52) U.S. Cl.
CPC ....... *H04N 5/23267* (2013.01); *B64C 39/024* (2013.01); *G05D 1/0607* (2013.01); *G05D 1/0858* (2013.01); *H04N 5/2329* (2013.01); *H04N 5/23216* (2013.01); *H04N 5/23254* (2013.01); *H04N 5/23258* (2013.01); *H04N 5/23299* (2018.08)

(58) Field of Classification Search
CPC ........... H04N 5/23267; H04N 5/23258; H04N 5/23299; H04N 5/2329; H04N 5/23254; H04N 5/23216; G05D 1/0607; G05D 1/0858; B64C 39/024

USPC ........................................................ 348/144
See application file for complete search history.

(56) References Cited

U.S. PATENT DOCUMENTS

| | | | |
|---|---|---|---|
| 2011/0267491 A1* | 11/2011 | Yokomitsu | G06K 9/00771 348/222.1 |
| 2012/0162426 A1* | 6/2012 | Murao | H04N 5/23219 348/148 |
| 2019/0096069 A1* | 3/2019 | Qian | G06T 7/74 |
| 2019/0294858 A1* | 9/2019 | Creedon | H04N 5/23229 |

* cited by examiner

*Primary Examiner* — Allen C Wong
(74) *Attorney, Agent, or Firm* — Athorus, PLLC

(57) ABSTRACT

An aerial vehicle is configured to process an image captured by an imaging device, and to identify a portion of the image that is likely to appear in images subsequently captured by the imaging device based on the motion of the aerial vehicle. A control unit aboard the aerial vehicle generates instructions for controlling such motion and provides the instructions to the imaging device. Based on such instructions, the imaging device processes the image to identify a portion of the image that will appear within a field of view of the imaging device following the motion, and selects a shutter speed, an aperture, a level of gain, or another attribute of the imaging device based on the portion of the image, in order to optimize the quality of an image subsequently captured by the imaging device.

20 Claims, 22 Drawing Sheets

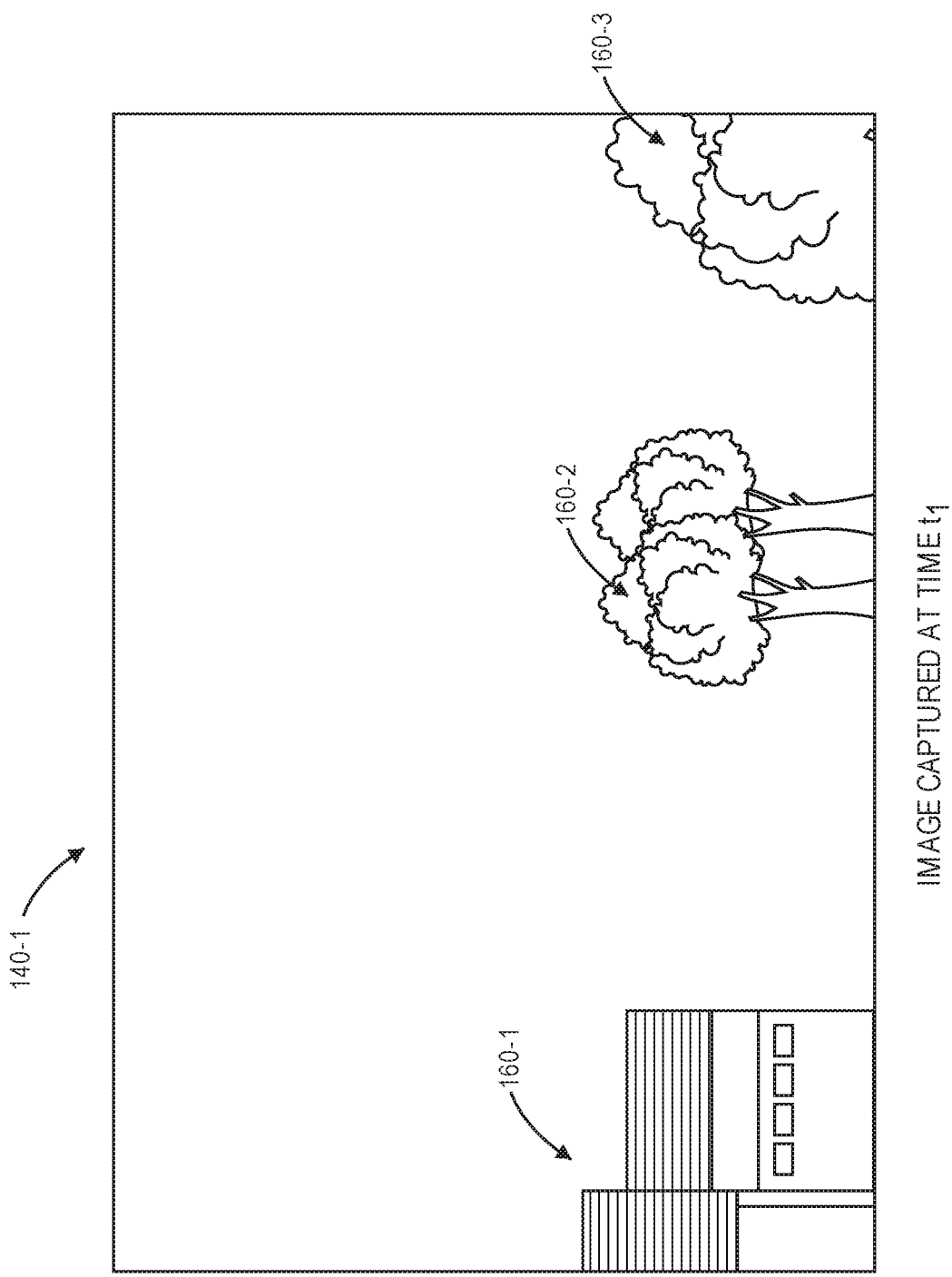

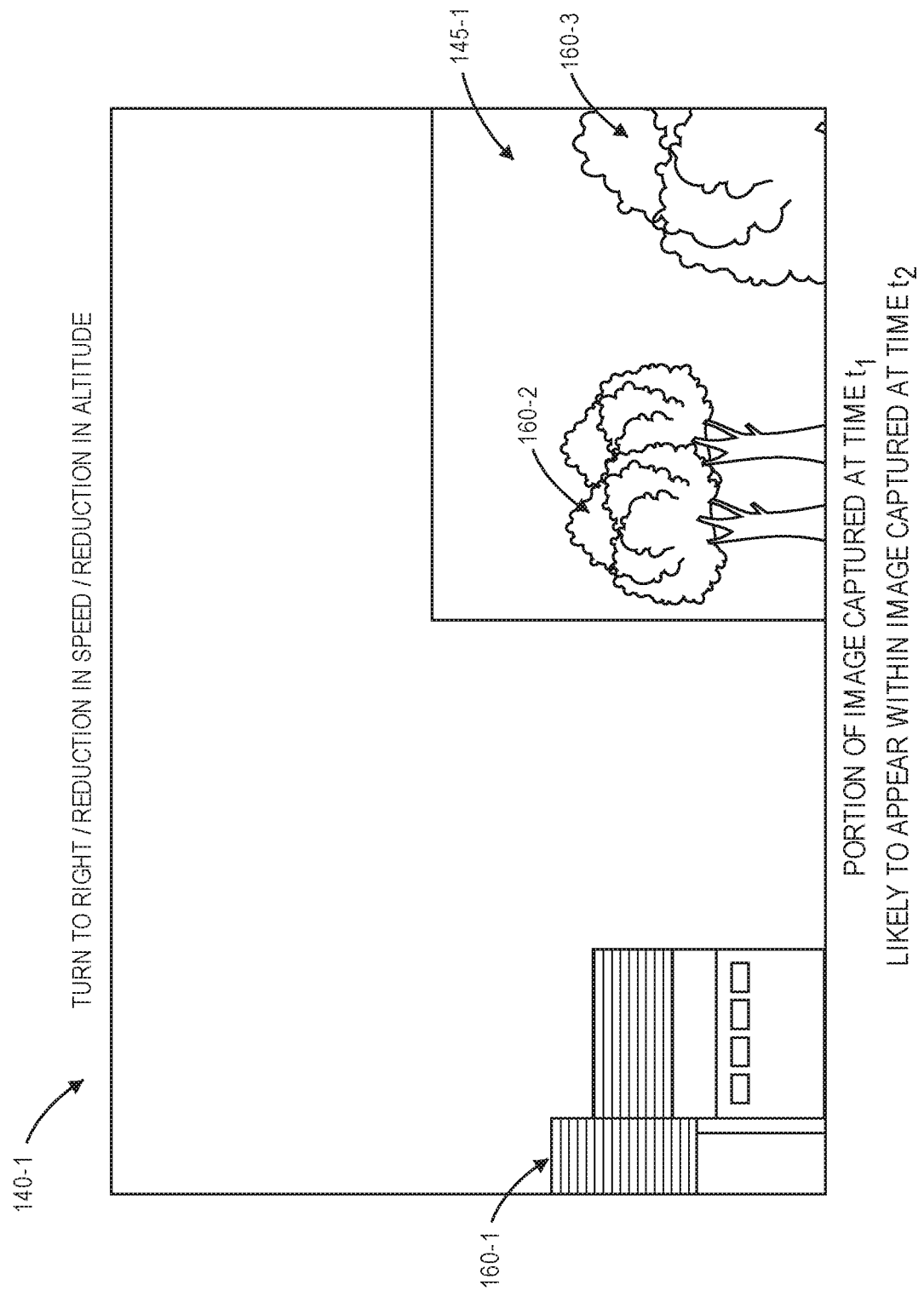

IMAGE CAPTURED AT TIME $t_1$

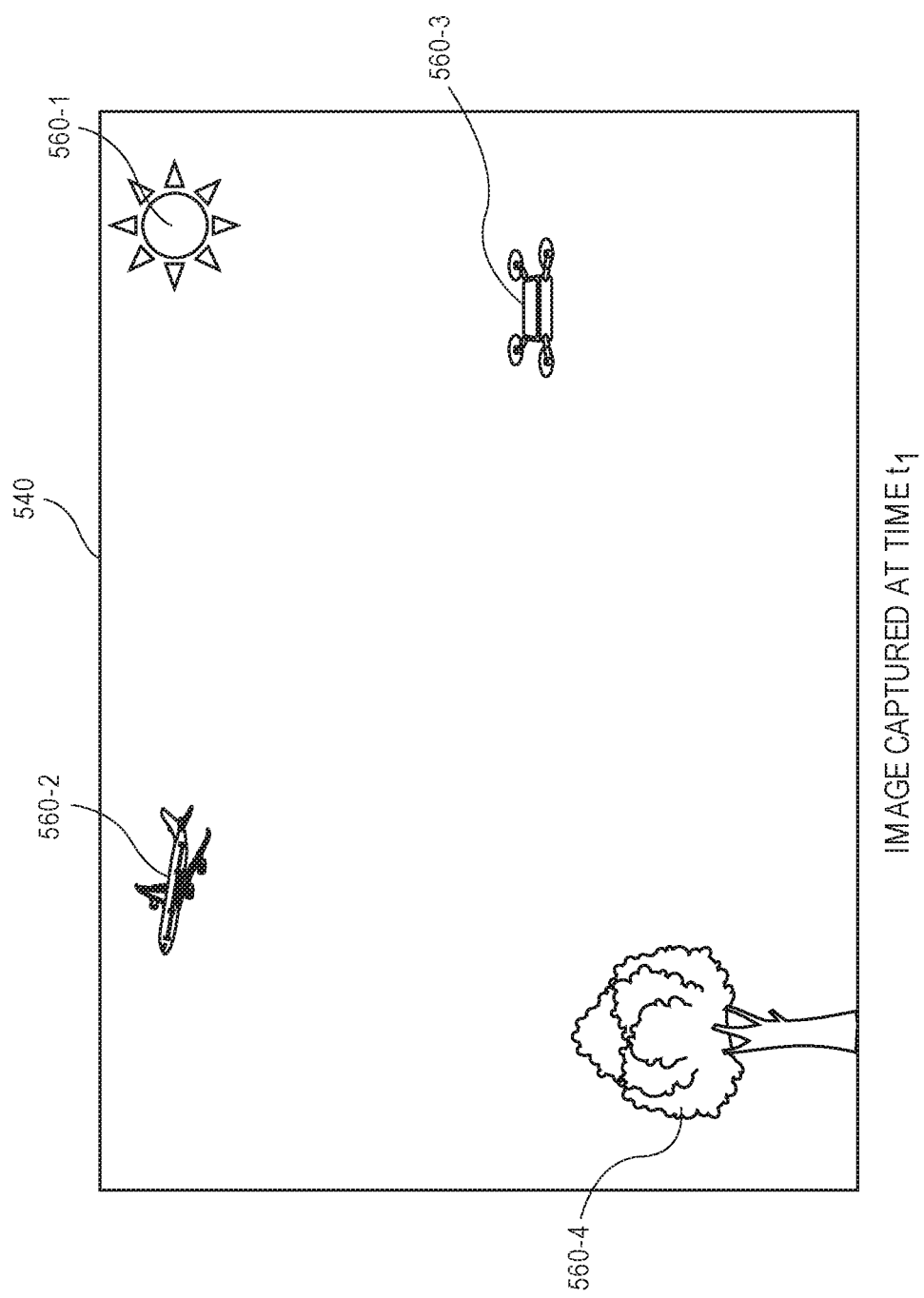

NO CHANGE
IN COURSE
OR ALTITUDE
AT TIME $t_2$

CONFIGURE
CAMERA BASED
ON CENTROID
OF IMAGE
CAPTURED AT
TIME $t_1$

INCREASE
ALTITUDE
AT TIME $t_2$

CONFIGURE
CAMERA BASED
ON UPPER SIDE
OF IMAGE
CAPTURED AT
TIME $t_1$

DECREASE
ALTITUDE
AT TIME $t_2$

CONFIGURE
CAMERA BASED
ON LOWER SIDE
OF IMAGE
CAPTURED AT
TIME $t_1$

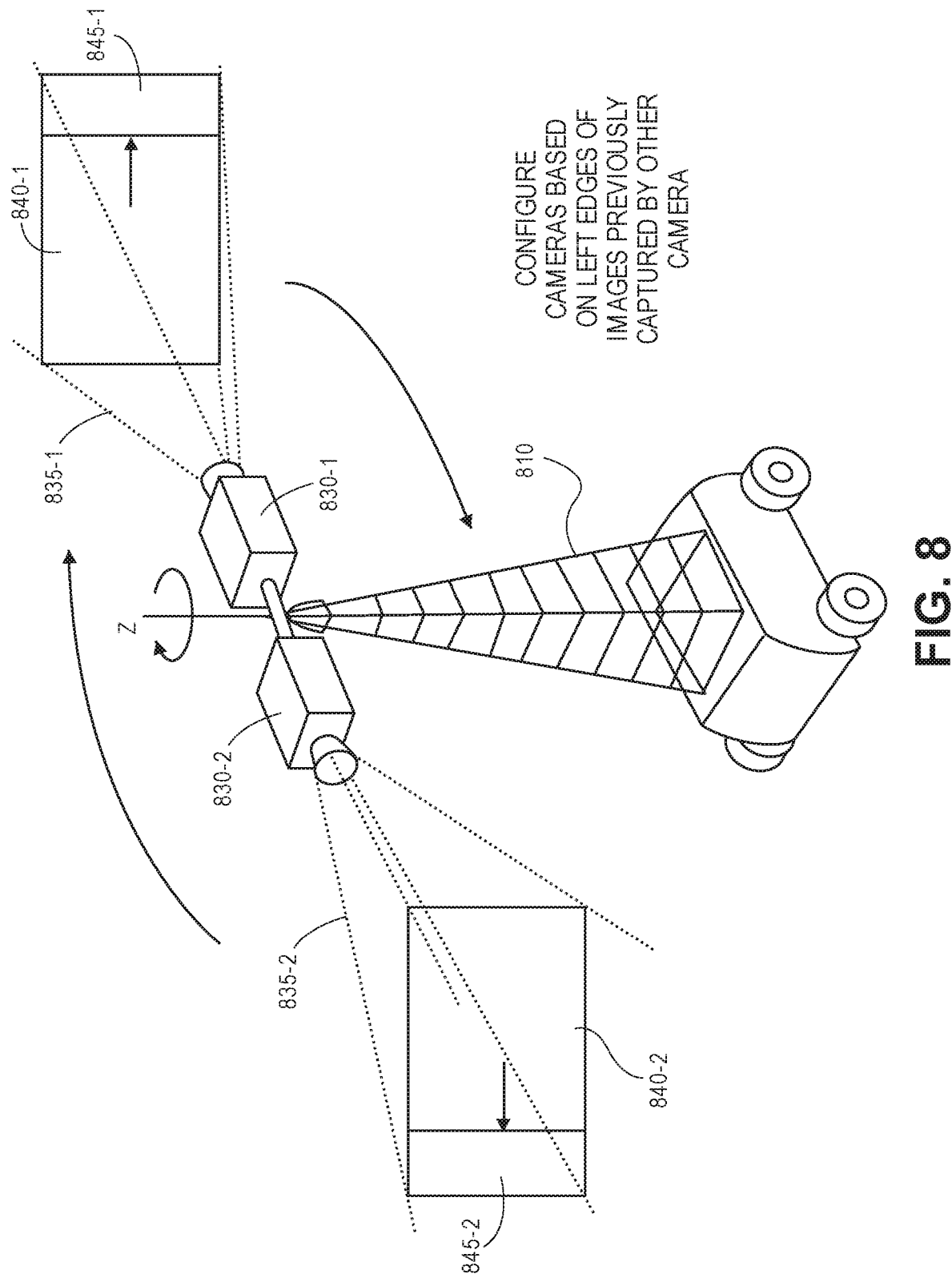

CONFIGURING IMAGING DEVICES BASED ON CONTROL SIGNALS

BACKGROUND

The use of imaging devices or other sensors during in-flight operations of aerial vehicles is increasingly common. In particular, unmanned aerial vehicles, or UAVs, are frequently equipped with one or more imaging devices such as digital cameras, range cameras, depth sensors, infrared sensors or other systems that may detect, capture and/or process visible or invisible light. Where an aerial vehicle is equipped with one or more imaging devices, such devices may be utilized in any number of operations or applications of the aerial vehicle, and for any purpose. For example, an imaging device may be used to capture imaging data such as still or moving images and any associated audio signals or metadata to aid in the safe operation of an aerial vehicle, e.g., for maneuvering or control. An imaging device carried aboard an aerial vehicle may be used in monitoring applications, such as when the aerial vehicle is utilized to photograph large or diverse areas, or areas from angles that cannot readily be accessed by grounded photographers or ground-based photographic equipment.

Many imaging devices are operated using automatic exposure algorithms, in which one or more attributes of the cameras are controlled to optimize the exposure of an image based on one or more attributes of a previously captured image. An image may be processed to generate a histogram of pixel brightness or intensities, e.g., a graphical representation of numbers of pixels having specific brightness or intensity levels. To the extent that the histogram indicates that the image is overexposed, or underexposed, an exposure time, a gain, an aperture, or one or more other attributes of the imaging device or variables associated with its operation may be adjusted to optimize a level of quality of a next image captured by the imaging device based on the histogram.

Where an imaging device is provided aboard an operating aerial vehicle or another structure, which may be stationary or in motion, contents of images captured by the imaging device vary from image to image as contents of a field of view of the imaging device change, due to motion or changes in orientation of the aerial vehicle or structure.

BRIEF DESCRIPTION OF THE DRAWINGS

FIGS. 1A through 1H are views of aspects of one system for configuring imaging devices based on control signals in accordance with embodiments of the present disclosure.

FIGS. 5A through 5G are views of aspects of one system for configuring imaging devices based on control signals in accordance with embodiments of the present disclosure.

FIG. 8 is a view of aspects of one system for configuring imaging devices based on control signals in accordance with embodiments of the present disclosure.

DETAILED DESCRIPTION

As is set forth in greater detail below, the present disclosure is directed to configuring an imaging device, such as an imaging device carried aboard an aerial vehicle, based on control signals for varying a position or an orientation of the imaging device, such as control signals generated for the operation of the aerial vehicle. More specifically, where a flight controller for the aerial vehicle indicates that a change in position or orientation of the aerial vehicle is occurring, or instructs that a change in the position or the orientation will occur, information or data regarding the change is used to select pixels of an image that was captured by an imaging device aboard the aerial vehicle which correspond to features that are likely to appear within a subsequent image to be captured by the imaging device, during or following the change in the position or the orientation. Qualities of the selected pixels may be determined and used to select an exposure time, a gain, an aperture, or another attribute of the imaging device for capturing another image, during or following the change in the position or the orientation.

Figure 1A:
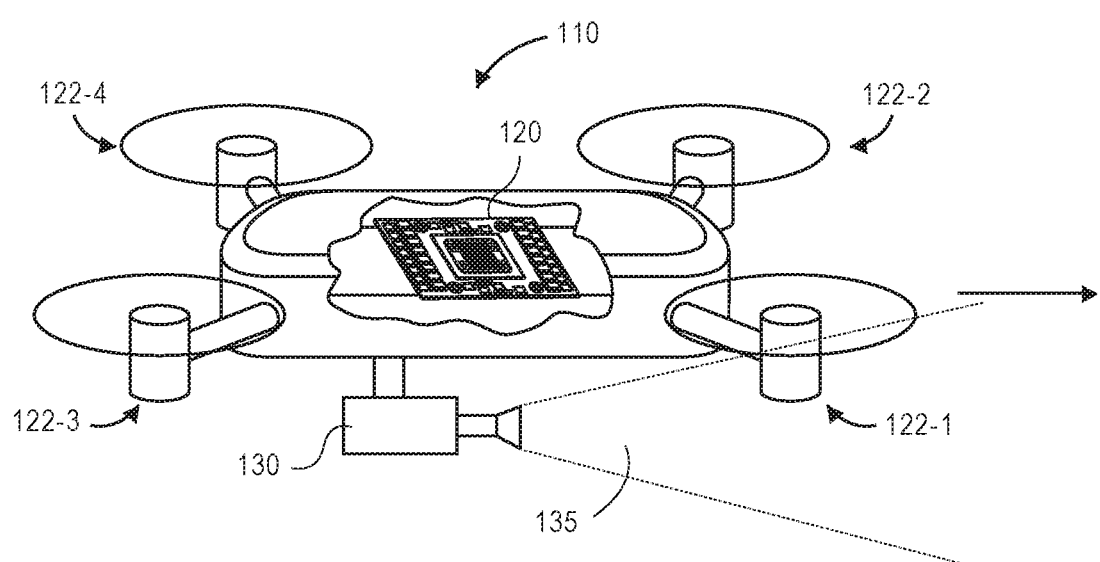

Referring to FIGS. 1A through 1H, views of aspects of one system for configuring imaging devices based on control signals in accordance with embodiments of the present disclosure are shown. As is shown in FIG. 1A, an aerial vehicle 110 features a plurality of propulsion motors 122-1, 122-2, 122-3, 122-4 and, optionally, one or more control surfaces (not shown), such as wings, rudders, ailerons, elevators, flaps, brakes or slats, or other components, mounted to a frame or other structure of the aerial vehicle 110. The aerial vehicle 110 further includes a digital camera 130 (e.g., an imaging device for capturing visual imaging data and/or depth imaging data). As is shown in FIG. 1A, the digital camera 130 has a field of view 135 oriented in a forward direction of travel of the aerial vehicle 110. Alternatively, in some embodiments, the digital camera 130 may be configured to vary an orientation of its field of view with respect to the aerial vehicle 110, e.g., by rotating about a yaw axis, a pitch axis or a roll axis. In some embodiments, the aerial vehicle 110 may include any number of other imaging devices (not shown), each of which may have fields of view aligned in any direction with respect to a direction of travel of the aerial vehicle 110.

The aerial vehicle 110 is operated under control of a control system 120 in communication with each of the plurality of propulsion motors 122-1, 122-2, 122-3, 122-4 and the digital camera 130 and, optionally, any control surfaces or other systems provided aboard the aerial vehicle 110. The control system 120 may include one or more computer devices, such as a central processing unit ("CPU"), a graphics processing unit ("GPU"), or another processor-driven component. In some embodiments, the control system 120 may perform control functions for operating one or more of the propulsion motors 122-1, 122-2, 122-3, 122-4, the digital camera 130 or any control surfaces or other aspects of the aerial vehicle 110, and may receive, transmit or otherwise be programmed with information or data regarding one or more missions to be performed by the aerial vehicle 110, e.g., coordinates or other identifiers of a location of an origin, a destination, or a task to be performed at the destination. The control system 120 may communicate with the propulsion motors 122-1, 122-2, 122-3, 122-4, the digital camera 130 or any control surfaces, or with one or more external computer devices or systems (not shown) by connections to one or more networks or in any other manner.

Figure 1B:
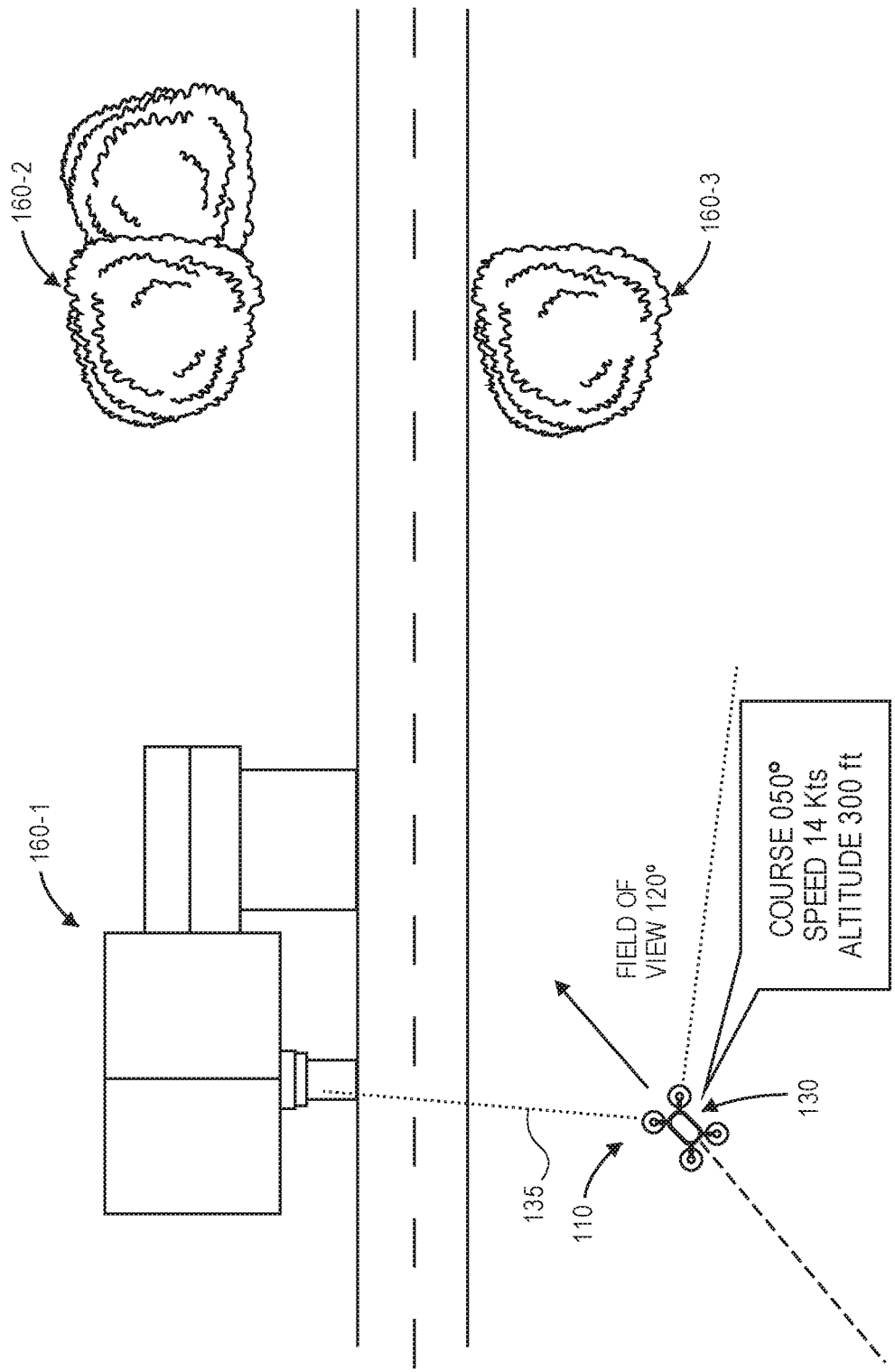

As is shown in FIG. 1B, the aerial vehicle 110 operates in an area with one or more objects 160-1, 160-2, 160-3, including a ground-based structure 160-1 (e.g., a dwelling) and ground-based plant life 160-2, 160-3 (e.g., sets of trees). As is shown in FIG. 1B, the aerial vehicle 110 is traveling on a course of fifty degrees (050°), at a speed of fourteen knots (14 kts) and at an altitude of three hundred feet (300 ft). The field of view 135 of the digital camera has a width of approximately one hundred twenty degrees (120°), and is centered about the course of travel of the aerial vehicle 110.

As is shown in FIG. 1C, an image 140-1 is captured by the digital camera 130 at a time $t_1$, with the aerial vehicle 110 traveling on the course, at the speed and at the altitude shown in FIG. 1B. In particular, and as is shown in FIG. 1C, the image 140-1 shows portions of the structure 160-1 and the plant life 160-2, 160-3, which are depicted in a lower portion of the image 140-1.

Figure 1D:
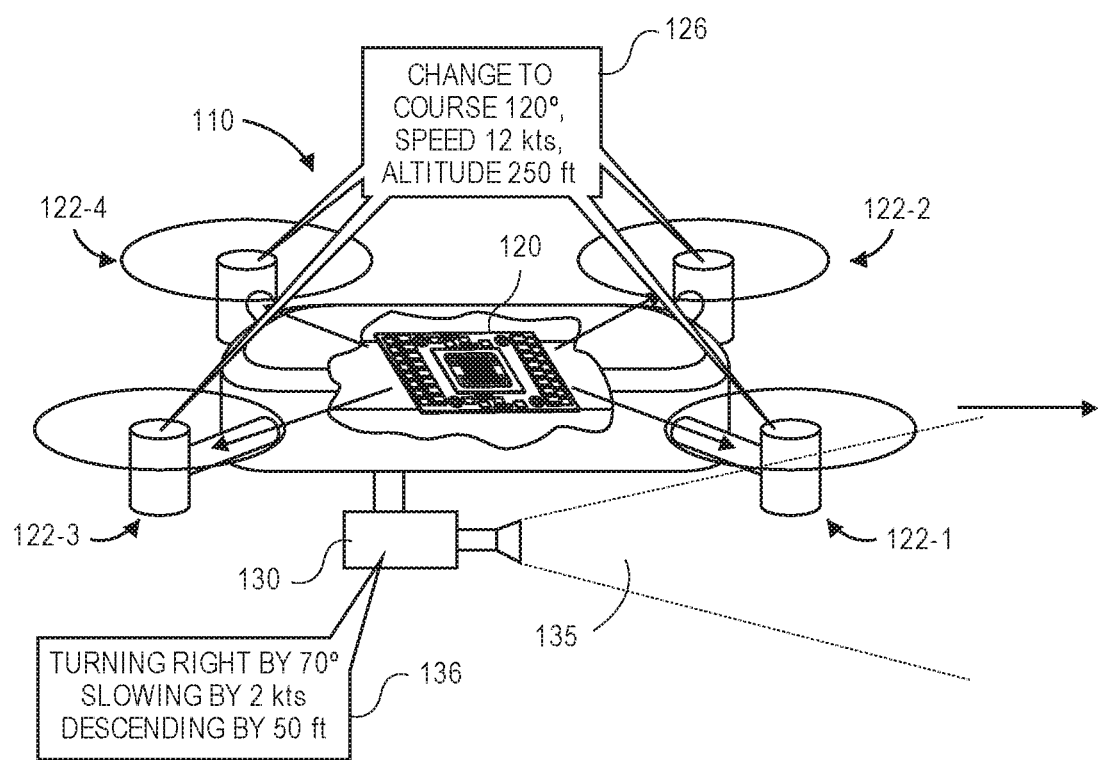

In accordance with some embodiments of the present disclosure, the digital camera 130 may be configured based on one or more control signals or other information or data generated by the control system 120 or any other onboard or remote computer systems for the purpose of operating the aerial vehicle 110. As is shown in FIG. 1D, the control system 120 provides one or more instructions 126 for causing the aerial vehicle 110 to change its course to one hundred twenty degrees (120°), to change its speed to twelve knots (12 kts) and to change its altitude to two hundred fifty feet (250 ft) to one or more of the propulsion motors 122-1, 122-2, 122-3, 122-4. In response to the instructions 126, the propulsion motors 122-1, 122-2, 122-3, 122-4 may increase or decrease their speeds, separately or in concert with one another, or, alternatively vary their angles or orientations to cause the aerial vehicle 110 to change its course, its speed and its altitude as instructed.

In real time, or in near-real time, the control system 120 provides information 136 regarding the instructions 126 to the digital camera 130. The information 136 may include any identifiers, descriptors and/or labels of the changes in course, speed and altitude directed by the control system 120, e.g., an extent by which the aerial vehicle 110 has been instructed to change its course, its speed and/or its altitude. Alternatively, the information 136 may include one or more of the instructions 126, and may be transmitted simultaneously or at an earlier time, e.g., in accordance with one or more plans for transiting within an area or performing one or more missions.

As is shown in FIG. 1E, in response to receiving the information 136, the digital camera 130 identifies a portion 145-1 of the image 140-1 that is likely to be present within an image captured by the digital camera 130 at a time $t_2$, e.g., after the change in course, in speed and in altitude is completed as instructed. For example, because the information 136 indicates that the aerial vehicle 110 is turning right, or will turn right, from a course of fifty degrees (050°) to a course of one hundred twenty degrees (120°), the portion 145-1 lies along a right side of the image 140-1, and does not include portions along a left side of the image 140-1. Background features or portions of the area such as the plant life 160-2, 160-3 along the right side of the image 140-1 are more likely to remain within the field of view 135 of the digital camera 130 after the aerial vehicle 110 completes the change in course, while background features or portions of the area such as the structure 160-1 along the left side of the image 140-1 are more likely to be absent from the field of view 135 after the aerial vehicle 110 completes the change in course.

Similarly, because the information 136 indicates that the aerial vehicle 110 is descending, or will descend, from an altitude of three hundred feet (300 ft) to an altitude of two hundred fifty feet (250 ft), the portion 145-1 lies along a bottom side of the image 140-1, and does not include an upper side of the image 140-1. Background features or portions of the area along the upper side of the image 140-1, such as the sky, are more likely to be absent from the field of view 135 as the aerial vehicle 110 completes the change in altitude, while background features or portions of the area along the lower side of the image 140-1, such as the plant life 160-2, 160-3, are more likely to remain within the field of view 135 after the aerial vehicle 110 completes the change in altitude.

The portion 145-1 may be selected on any basis, including a speed of the aerial vehicle 110, or a change in the speed, such as the slowing from fourteen knots to twelve knots, as indicated in the information 136, as well as a width of the field of view 135, a frame rate of the digital camera 130, any desired or predicted yaw rate, pitch rate or roll rate (not shown) during the changes in course or altitude, any prevailing environmental conditions within a vicinity of the aerial vehicle 110, or any other factor. Because the change in course from fifty degrees (050°) to one hundred twenty degrees (120°) is seventy degrees in the aggregate, none of the background features or portions that were included in the field of view 135 at time $t_1$, and are thus depicted in the image 140-1, will be present within the field of view 135 after the change in course is completed. The portion 145-1 is selected, therefore, to enhance the probability that the digital camera 130 will be properly exposed after the change in course is completed.

In some embodiments, the portion 145-1 may be selected on an aggregate basis, e.g., based on changes in course, speed or altitude in their entirety, by comparisons or differences between contents of the field of view 135 before and after such changes were completed. In some other embodiments, however, the portion 145-1 may be selected on a differential basis, e.g., based on an extent to which the features or contents present within the field of view 135 will change between images captured by the digital camera 130. For example, where an imaging device, such as the digital camera, is configured to capture images at a rate of thirty frames per second, the portion 145-1 may be selected based on predicted changes to the field of view 135 over a time differential of one-thirtieth of one second, or 33.3 milliseconds.

Figure 1F:
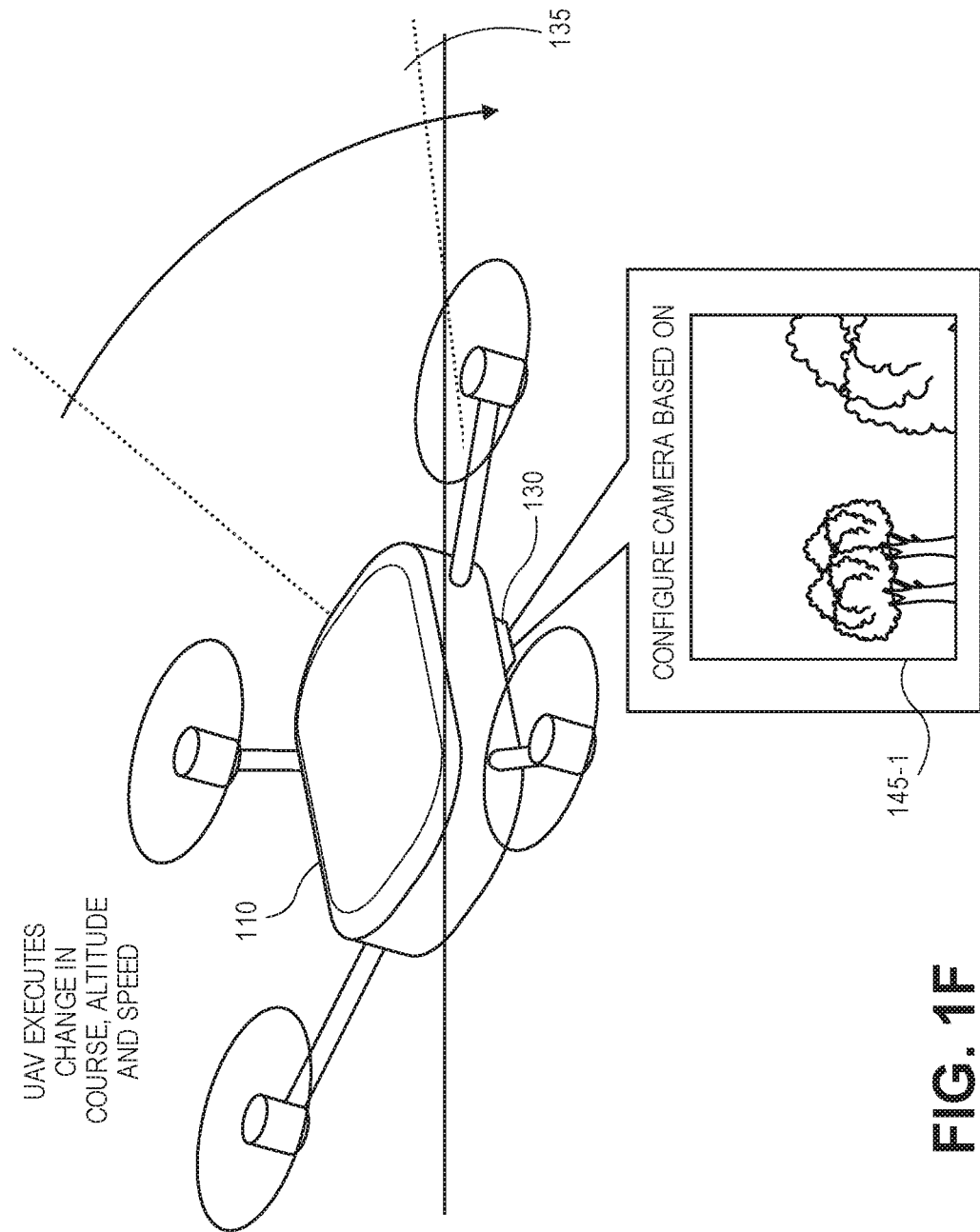

As is shown in FIG. 1F, as the aerial vehicle 110 executes the change in course, altitude and speed, thereby changing an orientation of the field of view 135, the digital camera 130 is configured based on the portion 145-1 of the image 140-1 determined as is shown in FIG. 1E. For example, based on the portion 145-1, an exposure time or shutter speed of the digital camera 130, an aperture setting or focal ratio of the digital camera 130, or a gain to be supplied by the digital camera 130 may be selected, e.g., by or for use in association with an automatic exposure algorithm.

Figure 1G:
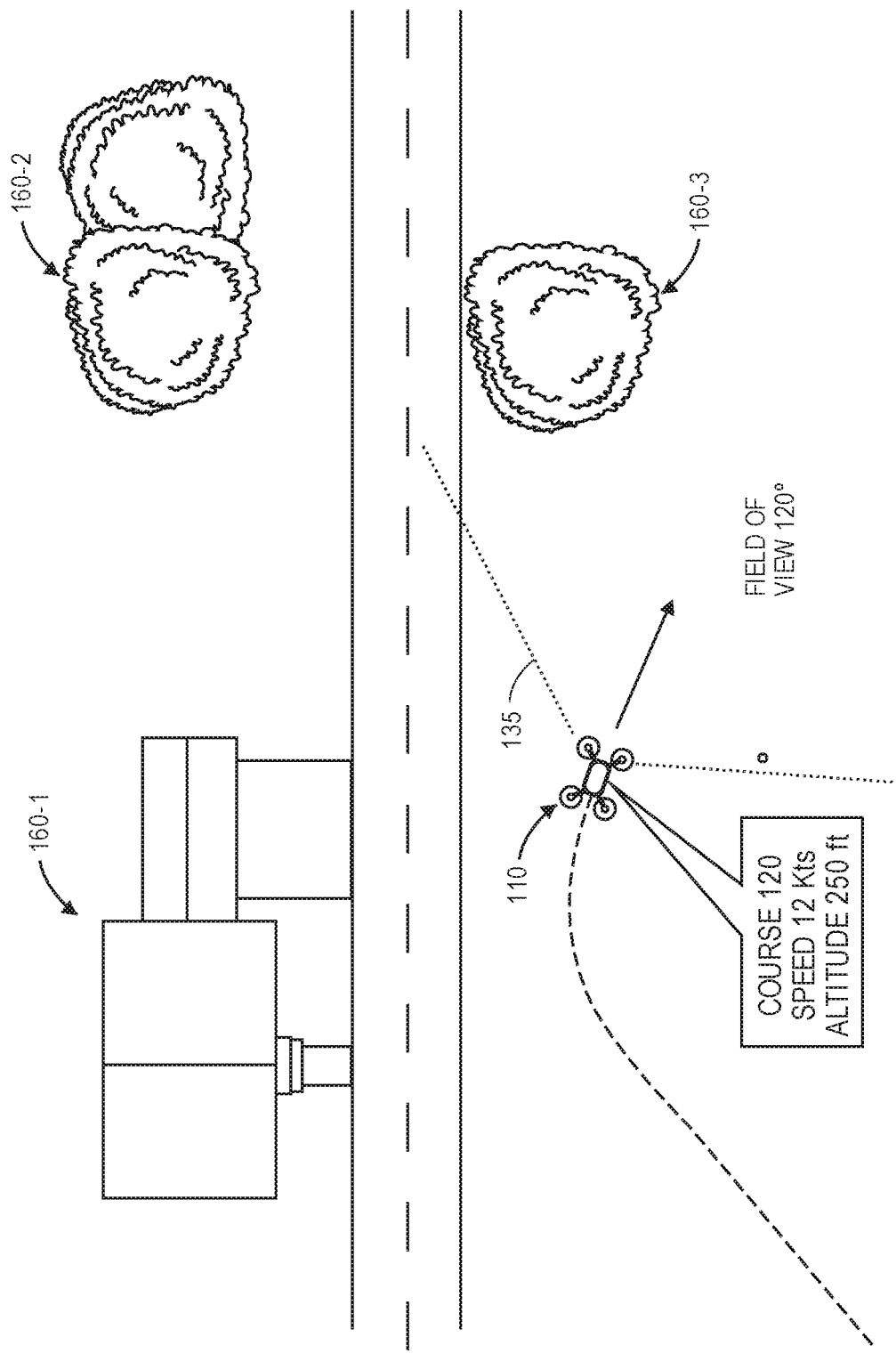
Figure 1H:
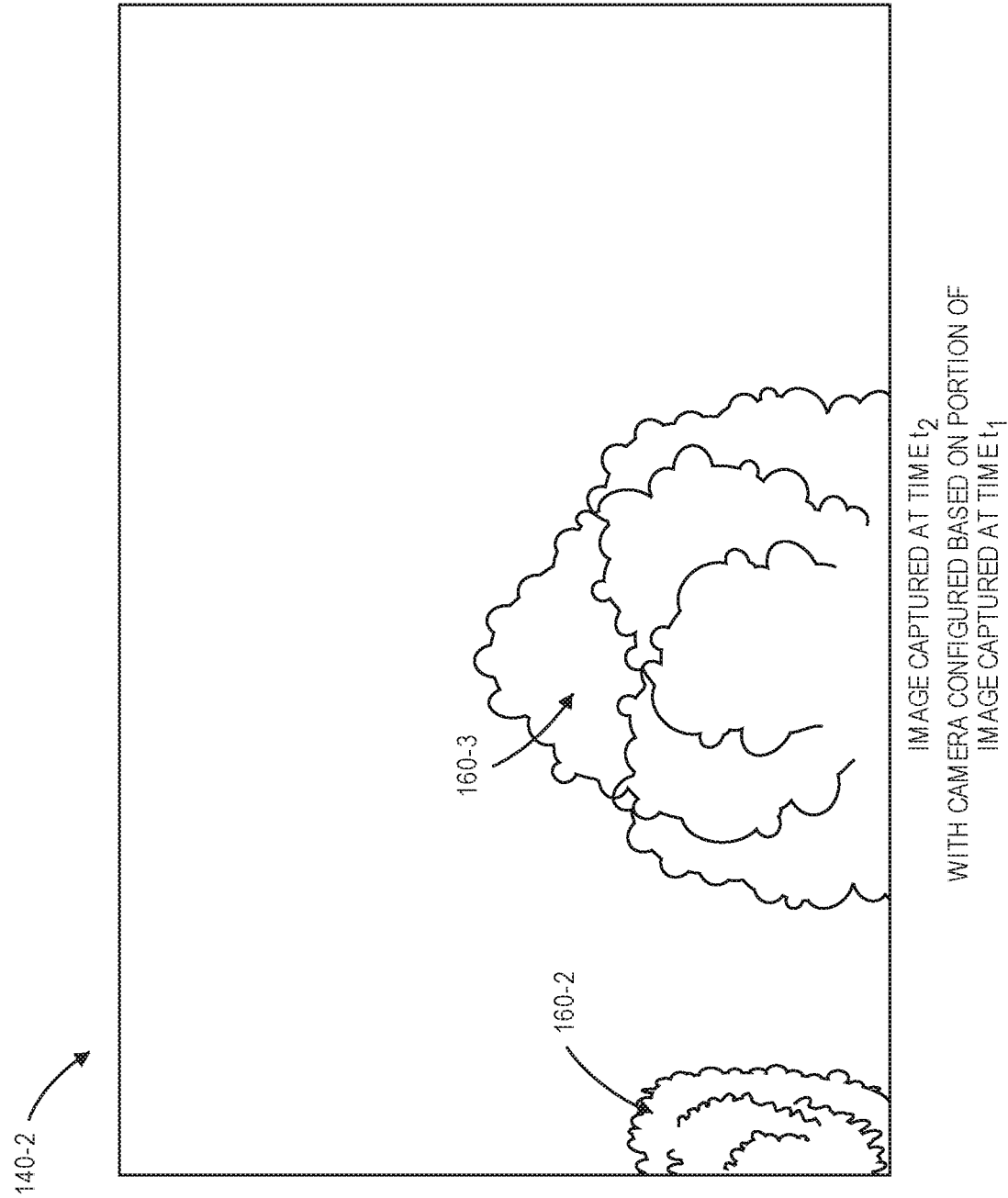

As is shown in FIG. 1G and FIG. 1H, the aerial vehicle 110 completes the change in course, altitude and speed. With the aerial vehicle 110 steady on the course, at the speed and at the altitude indicated in the information 136, the digital camera 130 captures an image 140-2 at the time $t_2$, with the digital camera 130 configured based on the portion 145-1 of the image 140-1 captured at the time $t_1$. The image 140-2 includes a portion of the plant life 160-2, 160-3 that was depicted within the portion 145-1 of the image 140-1, and is more likely properly exposed, based on the contents of the portion 145-1.

Accordingly, some embodiments of the present disclosure may be used to configure an imaging device (e.g., a digital camera) provided aboard an aerial vehicle or other movable structure based on control signals or other information or data associated with motion of the aerial vehicle or structure. Such signals or other information or data may be used to predict an orientation of a field of view of the imaging device, or contents of the field of view, and to identify portions of an image previously captured by the imaging device to optimize one or more attributes or variables for the capture of another image by the imaging device. Where it may be anticipated (e.g., based on one or more control signals) that an aerial vehicle or other structure will travel in directions of one or more axes, or rotate about one or more of such axes, the contents of the field of view of the imaging device may likewise be anticipated. An exposure time, a shutter speed, an aperture setting, a focal ratio or a level of gain, or any other attribute or variable for configuring the imaging device may be selected based on the anticipated motion.

In some embodiments, images captured by one imaging device may be processed based on one or more control signals received from a control system or other processor-driven component of an aerial vehicle to identify portions of such images that are likely to appear within a field of view of another imaging device, and attributes or variables for the operation of the other imaging device may be selected based on such portions. For example, where an aerial vehicle includes one imaging device aligned substantially forward or along a direction of travel, and another imaging device aligned vertically downward, e.g., toward ground, portions of a leading or upper side or edge of images captured by the imaging device that is aligned vertically downward may be used to configure the imaging device that is aligned substantially forward or along the direction of travel, as such portions may depict background features or portions of an area that are likely to appear within the field of view of that imaging device. Conversely, portions of a bottom side or edge of images captured by the imaging device that is aligned substantially forward may be used to configure the imaging device that is aligned substantially downward, as such portions may depict background features or portions of the area that are also likely to appear within the field of view of that imaging device.

A level of quality of an image may be manipulated by varying one or more attributes of a camera, including but not limited to an exposure time (e.g., a duration for which an imaging sensor is exposed to light by a shutter) or a lens aperture, which may be expressed quantitatively as a focal ratio, an "f-number," or an "f-stop" of the lens. In some models, an exposure value EV is calculated as a base-two logarithm of a quotient of a square of an f-number N, and an exposure time t, or $EV=\log_2(N^2/t)$. Thus, an exposure value $EV_i$ of an image i to be captured by an imaging device may be increased or decreased with respect to an exposure value $EV_{i-1}$ of an image i-1 previously captured by the imaging device by decreasing or increasing, respectively, the exposure time $t_1$ with respect to the exposure time at which the image i-1 was captured. Alternatively, the exposure value $EV_i$ of an image i to be captured by the imaging device may be exponentially increased or decreased with respect to the exposure value $EV_{i-1}$ of the image i-1 by increasing or decreasing, respectively, the f-number $N_i$ of the imaging device with respect to the f-number $N_{i-1}$ of the imaging device when the image i-1 was captured. Likewise, two images may have the same exposure values EV, even if the images are captured by imaging devices having different f-numbers N or for different exposure times t. Likewise, a level of gain of an imaging device corresponds to an extent to which a signal captured using an image sensor is amplified.

Attributes or variables of an imaging device may be set or otherwise established manually, e.g., by human interaction with the imaging device or one or more systems in communication with the imaging device, or automatically, e.g., according to one or more algorithms or techniques. For example, many automatic exposure algorithms take into variables regarding levels of quality of one or more previous images when selecting attributes or variables of the imaging device prior to capturing one or more subsequent images.

Figure 2:
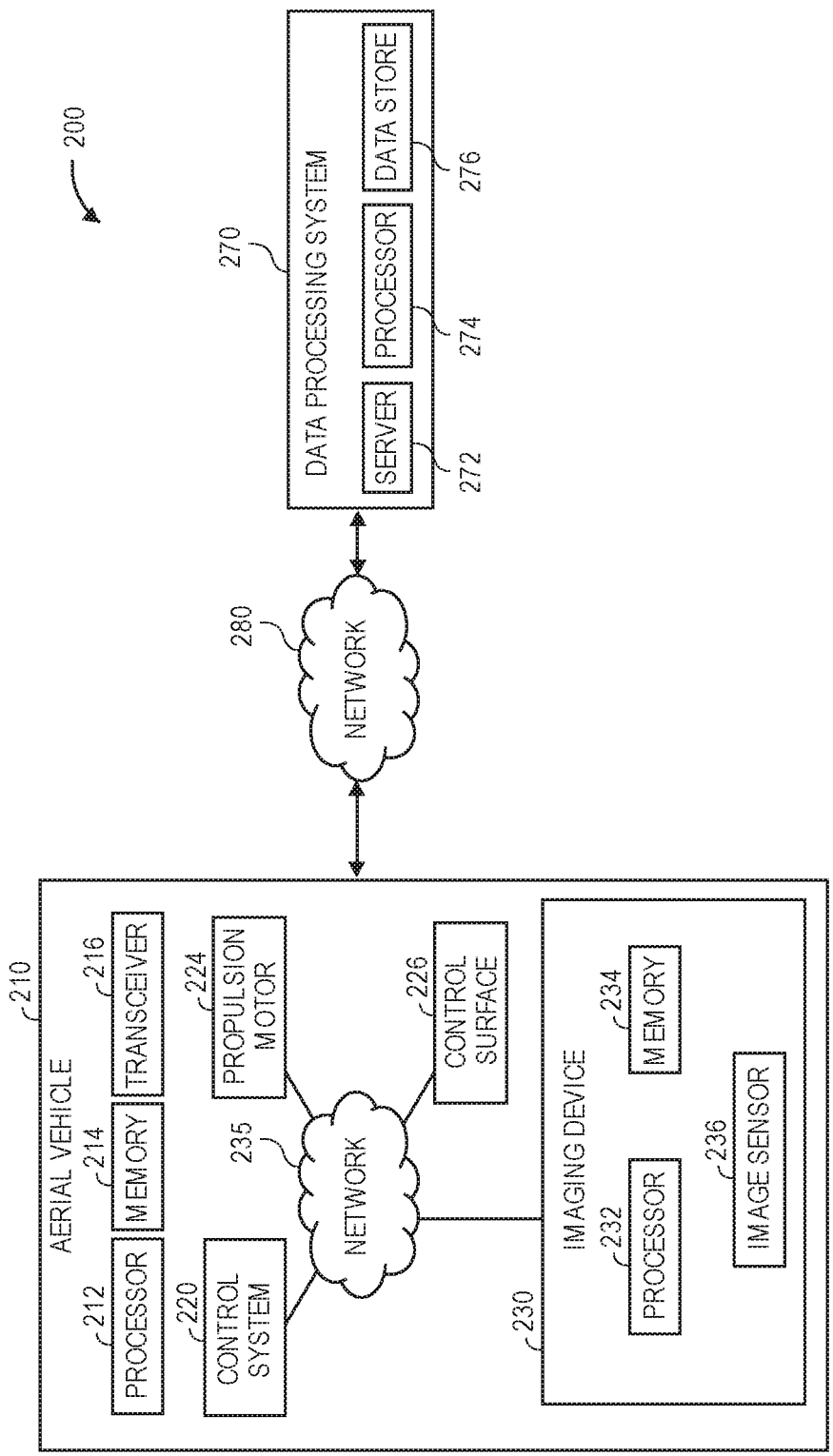
FIG. 2 is a block diagram of one system for configuring imaging devices based on control signals in accordance with embodiments of the present disclosure.

Referring to FIG. 2, a block diagram of components of one system 200 for configuring imaging devices based on control signals in accordance with embodiments of the present disclosure is shown. The system 200 of FIG. 2 includes an aerial vehicle 210 and a data processing system 270 connected to one another over an external network 280, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1H.

The aerial vehicle 210 includes a processor 212, a memory 214 and a transceiver 216, as well as a control system 220, one or more propulsion motors 224, one or more control surfaces 226, and an imaging device 230 that are connected to one another over an internal network 235.

The processor 212 may be configured to perform any type or form of computing function, including but not limited to the execution of one or more machine learning algorithms or techniques. For example, the processor 212 may control any aspects of the operation of the aerial vehicle 210 and the one or more computer-based components thereon, including but not limited to the control system 220, the propulsion motors 224, the control surfaces 226 and/or the imaging device 230. The processor 212 may further control any aspects of the operation of any number of additional components that may be provided thereon, including but not limited to one or more radar sensors, laser sensors, acoustic sensors, or any other sensor that is configured to capture information or data in one or more directions or along one or more axes, as well as one or more illuminators (e.g., fixed or addressable lights configured to project light of any color, frequency or wavelength, in any direction), or one or more engagement systems. Furthermore, the processor 212 may control the operation of the control system 220 or one or more other modules (not shown), e.g., for generating instructions for operating one or more of the propulsion motors 224, the control surfaces 226, the imaging device 230, or one or more sensors, illuminators or engagement systems (not shown). Alternatively, the processor 212 may be a component part of one or more of such systems, e.g., the control system 220.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor implementing any of a number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

The aerial vehicle 210 further includes one or more memory or storage components 214 (such as databases or data stores) for storing any type of information or data, e.g., instructions for operating the aerial vehicle 210, or information or data captured during operations of the aerial vehicle 210. Additionally, the memory 214 may be configured to store executable instructions, flight paths, flight control parameters and/or other data items accessible by or to the processor 212. The memory 214 may be implemented using any suitable memory technology, such as static random-access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the external network 280 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the external network 280. For example, in some embodiments, the transceiver 216 may be configured to coordinate I/O traffic between the processor 212 and one or more onboard or external computer devices or components. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or incorporated directly into the processor 212.

In some embodiments, the transceiver 216 may transmit and/or receive signals according to the Bluetooth® Low Energy, e.g., within a frequency spectrum of approximately 2.4000 to 2.4835 gigahertz (GHz), and in two-megahertz (2 MHz) channels, or according to the Ultra-Wideband standard, e.g., within a frequency spectrum of approximately 3.1 to 10.6 gigahertz (GHz), with bandwidths of at least five hundred megahertz (500 MHz), or at least twenty percent of a center frequency. The transceiver 216 may include any number of processors, chips (e.g., chipsets) or other components that are commonly associated with or required for communication according to a selected communications protocol or standard, or programmed as necessary (e.g., with one or more applications and/or sets of instructions) in order to communicate according to the selected protocol or standard. The signals transmitted and/or received by the transceiver 216 may be of any kind or type, and may be sent over the external network 280.

As is shown in FIG. 2, each of the control system 220, the propulsion motors 224, the control surfaces 226 and the imaging device 230 is connected to one another over the internal network 235, which may be wired or wireless in nature. Alternatively, in some embodiments, one or more of the processor 212, the memory 214 and/or the transceiver 216 may also be connected to the internal network 235. In some other embodiments, the control system 220, the propulsion motors 224, the control surfaces 226 and the imaging device 230 may be connected to one another directly, e.g., by one or more wired connections.

The control system 220 may be associated with the processor 212, the memory 214, the transceiver 216 and/or with one or more other computing devices or machines provided aboard the aerial vehicle 210 or accessible over the external network 280. The control system 220 may include one or more electronic speed controls, power supplies, navigation systems and/or payload engagement controllers for controlling the operation of the aerial vehicle 210 and for engaging with or releasing items, as desired. For example, the control system 220 may be configured to cause or control the operation of one or more of the propulsion motors 224, the control surfaces 226 and/or the imaging devices 230, such as to cause one or more of the propulsion motors 224 to rotate one or more propellers at a desired speed or to place one or more of the control surfaces 226 in a selected orientation or position, in order to guide the aerial vehicle 210 along a determined or desired flight path, and to cause the imaging device 230 to capture any imaging data (e.g., still or moving images) as well as any associated audio data and/or metadata, e.g., by transmitting one or more instructions or signals over the internal network 235. The control system 220 may further control other aspects of the aerial vehicle 210, including but not limited to the engagement with or release of one or more items by one or more engagement systems (not shown).

The control system 220 may be configured to communicate with the data processing system 270 or the one or more other computer devices or machines (not shown) over the external network 280, through the sending and receiving of digital data, e.g., by the transceiver 216 or by any other system. In some embodiments, the control system 220 may be integrated with one or more of the processor 212, the memory 214 and/or the transceiver 216.

The propulsion motors 224 may be any type or form of motor (e.g., electric, gasoline-powered or any other type of motor) capable of generating sufficient rotational speeds of one or more propellers or other components to provide lift and/or thrust forces to the aerial vehicle 210 and any engaged payload, and to aerially transport the engaged payload thereby. For example, one or more of the propulsion motors 224 may be a brushless direct current (DC) motor such as an outrunner brushless motor or an inrunner brushless motor. The aerial vehicle 210 may include any number of such propulsion motors 224 of any kind. For example, one or more of the motors 224 may be aligned or configured to provide forces of lift to the aerial vehicle 210, exclusively, while one or more of the propulsion motors 224 may be aligned or configured to provide forces of thrust to the aerial vehicle 210, exclusively. Alternatively, one or more of the propulsion motors 224 may be aligned or configured to provide forces of lift and forces of thrust to the aerial vehicle 210, as needed. For example, the propulsion motors 224 may be fixed in their orientation on the aerial vehicle 210, or configured to vary their respective orientations, e.g., a tilt-rotor aircraft. Moreover, the propulsion motors 224 may be aligned or configured to operate with different capacities or ratings, or at different speeds, or coupled to propellers having different sizes and shapes. The propulsion motors 224 may operate under the control of the control system 220, the processor 212 or any other processing unit (not shown) provided aboard the aerial vehicle 210 or accessible by or to the aerial vehicle 210, e.g., over the external network 280.

The control surfaces 226 may be any sections or appurtenances provided on the aerial vehicle 210 that may be manipulated in order to dynamically modify a position or orientation of the aerial vehicle 210 with respect to one or more degrees of freedom. For example, the control surfaces 226 may include, but are not limited to, wings, rudders, ailerons, elevators, flaps, brakes or slats, or other features. The aerial vehicle 210 may include any number of control surfaces 226 of any kind, and the control surfaces 226 may operate under the control of the control system 220, the processor 212 or any other processing unit (not shown) provided aboard the aerial vehicle 210 or accessible by or to the aerial vehicle 210, e.g., over the external network 280.

The imaging device 230 may be any form of optical recording device that may be used to photograph or otherwise record imaging data of structures, facilities, terrain or any other elements appearing within a field of view. The imaging device 230 may include one or more processors 232, memory components (or storage components) 234 and image sensors 236. Such sensors, memory components or processors may further include one or more photosensitive surfaces, filters, chips, electrodes, clocks, boards, timers, power sources, connectors or any other relevant features (not shown). The imaging device 230 may capture imaging data in the form of one or more still or moving images of any kind or form, as well as any relevant audio signals or other information. The imaging device 230 may also be independently adapted or otherwise configured to communicate with the data processing system 270 or any other external computer systems (not shown) by way of the external network 280. The imaging device 230 may operate under the control of the control system 220, the processor 212 or any other processing unit (not shown) provided aboard the aerial vehicle 210 or accessible by or to the aerial vehicle 210, e.g., over the external network 280.

The image sensors 236 may be or include one or more visual sensors (e.g., color or "RGB" sensors, grayscale sensors and/or black-and-white sensors), depth sensors, or any other sensors that are configured to capture visual imaging data (e.g., textures), depth imaging data (e.g., ranges) or any other imaging data regarding objects within one or more fields of view of the imaging device 230. For example, the image sensors 236 may be any sensors having single elements or a plurality of photoreceptors or photosensitive components (e.g., a CCD sensor, a CMOS sensor, or another sensor), which may be typically arranged in an array. Light reflected from objects within a field of view of the imaging device 230 may be captured by the image sensor 236, and quantitative values, e.g., pixels, may be assigned to one or more aspects of the reflected light. In some embodiments, the imaging device 230 may further include one or more illuminators (not shown), such as a laser system or a light-emitting diode (or "LED") for illuminating a portion of a scene appearing within a field of view of the imaging device 230 with light at any wavelength. In some embodiments, an illuminator may illuminate a portion of a scene by infrared or near-infrared light, such as light with wavelengths ranging from approximately seven hundred to approximately one thousand nanometers (700-1000 nm).

In some embodiments, the imaging device 230 may have both a depth sensor and an RGB sensor (or grayscale sensor or black-and-white sensor). Alternatively, the imaging device 230 may have just a depth sensor or just an RGB sensor. For example, the imaging device 230 may be an RGB color camera, a still camera, a motion capture/video camera or any other type or form of camera. In other implementations, the imaging device 230 may be depth-sensing cameras, such as an RGBz or RGBD camera. In still other implementations, the imaging device 230 may be a thermographic or infrared (IR) camera. Additionally, in some implementations, the imaging device 230 may simply be a camera module that includes a lens and an image sensor configured to convert an optical image obtained using the lens of the camera into a digital signal or digital representation of the image (generally referred to herein as imaging data).

The imaging device 230 may further include any other components (not shown) that may be required in order to capture, analyze and/or store imaging data. For example, the imaging device 230 may capture one or more still or moving images (e.g., streams of visual and/or depth image frames), along with any relevant audio signals or other information (e.g., position data), and may also connect to or otherwise communicate with the server 272, or any other computer devices over the external network 280, through the sending and receiving of digital data. In some implementations, the imaging device 230 may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 272 or over the external network 280 directly.

In some embodiments, the processors 232 may be configured to select an exposure time or shutter speed for the imaging device 230. In some embodiments, the processors 232 may be configured to select an aperture or focal ratio for the imaging device 230. In some embodiments, the processors 232 may be configured to select a level of gain for the imaging device 230. In some embodiments, the processors 232 may be configured to execute one or more algorithms for automatically controlling the operation of the imaging device 230, including one or more algorithms for automatically selecting one or more of the exposure time or shutter speed, the aperture or focal ratio, or the gain of the imaging device 230, and operating the imaging device 230 with the selected exposure time or shutter speed, the selected aperture or focal ratio or the selected gain.

The processors 232 may also be configured to process imaging data captured by one or more of the image sensors 236 and/or stored in the memory 234, or take any other action. For example, in some embodiments, the processors 232 may be configured to identify one or more brightness or intensity levels or other attributes of images, or of select portions of images, captured by the imaging device 230 or any other imaging device (not shown), e.g., a histogram of brightness or intensities associated with one or more pixels. The processors 232 may further receive instructions from an external source, e.g., the control system 220 and/or the processor 212, in identifying the select portions of the images for which brightness or intensity levels or attributes are to be determined. In some embodiments, the processors 232 may execute one or more algorithms for automatically controlling the operation of the imaging device 230 based on selected exposure times or shutter speeds, selected apertures or focal ratios, or selected gains, as determined based on brightness or intensity levels or other attributes of images, or of select portions of images. In some other embodiments, the processors 232 may be configured to execute any other type or form of algorithm, including but not limited to machine learning algorithms, e.g., an artificial neural network.

The imaging device 230 may also include manual or automatic features for modifying their respective fields of view or orientations. For example, the imaging device 230 may be configured in a fixed position, or with a fixed focal length (e.g., fixed-focus lenses) or angular orientation. Alternatively, the imaging device 230 may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging device 230, or changes in one or more of the angles defining the angular orientation.

For example, the imaging device 230 may be hard-mounted to a support or mounting that maintains the device in a fixed configuration or angle with respect to one, two or three axes. Alternatively, however, the imaging device 230 may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

The imaging device 230 may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

In addition to the imaging device 230, the aerial vehicle 210 may also include any number of other sensors, components or other features (not shown) for controlling or aiding in the operation of the aerial vehicle 210, including but not limited to position sensors (e.g., Global Positioning System transceivers), accelerometers, gyroscopes, altimeters (e.g., a pressure altimeter, a sonic altimeter and/or a radar altimeter), speedometers (e.g., anemometers), thermometers, barometers, hygrometers, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges or sound sensors (e.g., microphones, piezoelectric sensors, vibration sensors or other transducers for detecting and recording acoustic energy from one or more directions). Such sensors may include any number of memory or storage components and processors, photosensitive surfaces, filters, chips, electrodes, clocks, boards, timers or any other relevant features (not shown).

Although the block diagram 200 of FIG. 2 includes a single box corresponding to the aerial vehicle 210, and a single box corresponding to the imaging device 230, those of ordinary skill in the pertinent arts will recognize that the system 200 may include any number of aerial vehicles, each having any number of imaging devices, including features that are identical to one another, or are customized in any manner. For example, each of the aerial vehicles in the system 200 may include one or more of the components of the aerial vehicle 210, e.g., the control system 220, the propulsion motors 224, the control surfaces 226 and/or the imaging devices 230, or any number of additional components and/or sensors (not shown).

The data processing system 270 includes one or more physical computer servers 272 and/or processors 274 having a plurality of data stores 276 associated therewith, and the servers 272, the processors 274 and/or the data stores 276 may be provided for any specific or general purpose. For example, the data processing system 270 of FIG. 2 may be independently provided for the exclusive purpose of receiving, analyzing or storing information or data received from the aerial vehicle 210, e.g., position information and/or imaging data, or, alternatively, provided in connection with one or more physical or virtual services. The servers 272 may be connected to or otherwise communicate with the processors 274 and/or the data stores 276. The data stores 276 may store any type of information or data, including but not limited to acoustic signals, information or data relating to imaging data, or information or data regarding environmental conditions, operational characteristics, or positions, for any purpose. The servers 272 and/or the computer processors 274 may also connect to or otherwise communicate with the external network 280, through the sending and receiving of digital data. For example, the data processing system 270 may include any facilities, stations or locations having the ability or capacity to receive and store information or data, such as signals and/or position information or data, in one or more data stores, or from one or more other external computer systems (not shown) via the external network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more aerial vehicles, including but not limited to the aerial vehicle 210.

The external network 280 may be any wired network, wireless network, or combination thereof, and may comprise the Internet in whole or in part. In addition, the external network 280 may be a personal area network, local area network, wide area network, cable network, satellite network, cellular telephone network, or combination thereof. The external network 280 may also be a publicly accessible network of linked networks, possibly operated by various distinct parties, such as the Internet. In some embodiments, the external network 280 may be a private or semi-private network, such as a corporate or university intranet. The external network 280 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 270 may use any web-enabled or Internet applications or features, or any other client-server applications or features including E-mail or other messaging techniques, to connect to the external network 280, or to communicate with one another, such as through short or multimedia messaging service (SMS or MMS) text messages. For example, the aerial vehicle 210 may be adapted to transmit information or data in the form of synchronous or asynchronous messages to the data processing system 270 or to any other computer device (e.g., to one or more other aerial vehicles) in real time or in near-real time, or in one or more offline processes, via the external network 280. Those of ordinary skill in the pertinent art would recognize that the aerial vehicle 210 or the data processing system 270 may operate or be operated by any of a number of computing devices that are capable of communicating over the external network 280. Protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212, the processor 232 or the processor 274, or any other computers or control systems utilized by the aerial vehicle 210 or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an aerial vehicle, e.g., the processor 212, or an imaging device, e.g., the processor 232, which may independently act upon instructions generated by such processors upon executing such functions or tasks. In some other implementations, each of such functions or tasks may be executed by processors that are external to an aerial vehicle or an imaging device, e.g., the processor 274, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more aerial vehicles or imaging devices, while other functions or tasks may be executed by processors located in one or more other physical, alternate or virtual locations.

Figure 3:
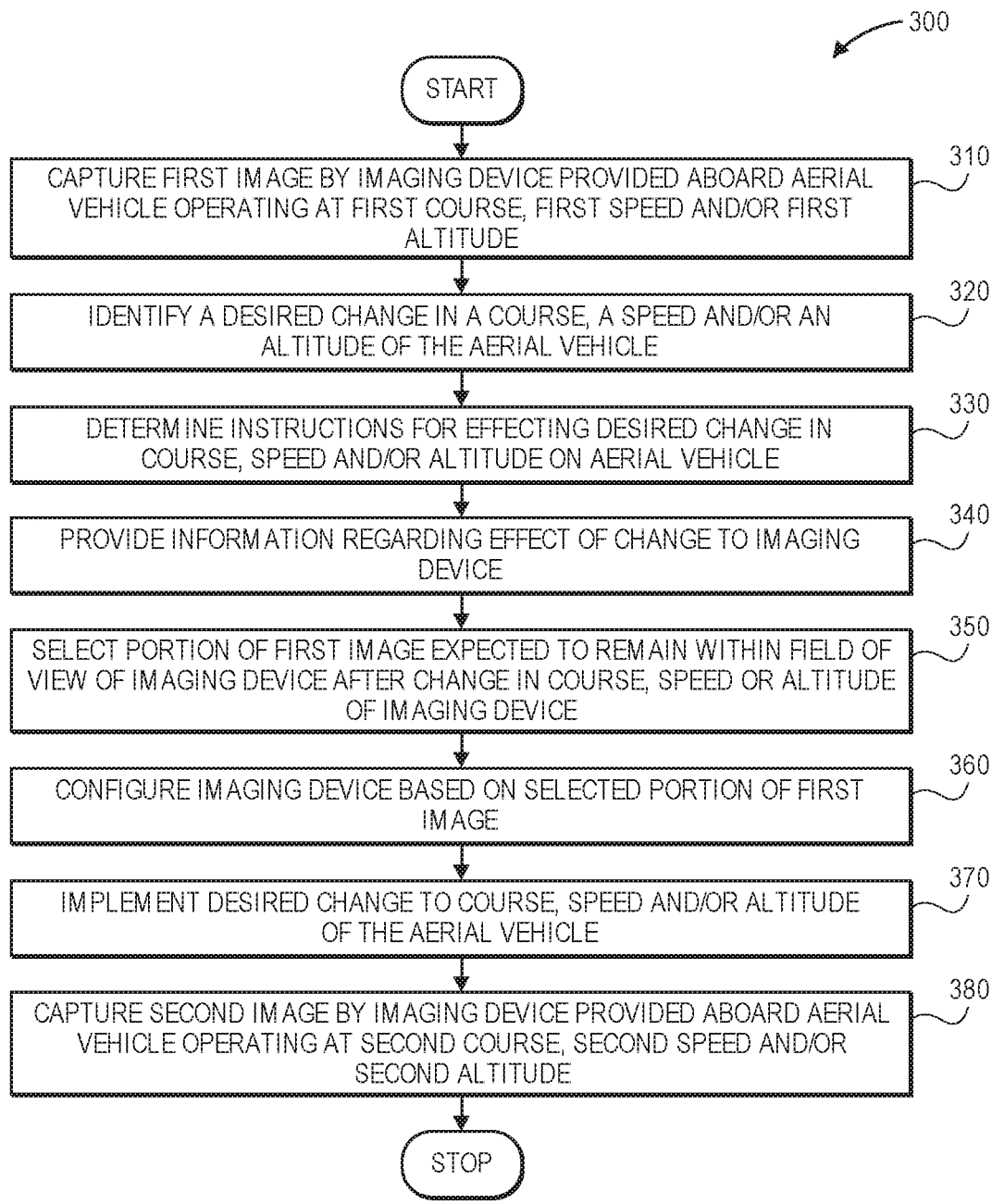
FIG. 3 is a flow chart of one process for configuring imaging devices based on control signals in accordance with embodiments of the present disclosure.

Referring to FIG. 3, a flow chart 300 of one process for configuring imaging devices based on control signals in accordance with embodiments of the present disclosure is shown.

At box 310, a first image is captured by an imaging device provided aboard an aerial vehicle operating at a first course, a first speed and/or a first altitude. For example, in some embodiments, the imaging device may be a digital camera (e.g., a visual camera and/or a depth camera) aligned at any angle with respect to one or more of a yaw axis, a pitch axis and/or a roll axis of the aerial vehicle. The imaging device may be configured to capture imaging data at any exposure time or shutter speed, or at any aperture setting (e.g., at any focus ratio or f-number), and to apply any gain to the imaging data. Additionally, in some embodiments, the imaging device may be mounted to the aerial vehicle with a field of view in a fixed position with respect to the aerial vehicle, with a fixed focal length or with a fixed angular orientation with respect to the aerial vehicle. In other embodiments, the imaging device may be repositionable with respect to the aerial vehicle, may have an adjustable focal length or may have an adjustable angular orientation with respect to the aerial vehicle.

At box 320, a desired change in a course, a speed and/or an altitude of the aerial vehicle is identified. The desired change may be determined at any time, e.g., in real time or in near-real time, such as in response to one or more environmental conditions, or in accordance with a mission plan. In some embodiments, the aerial vehicle may be configured to perform one or more missions having any purpose or intended result, such as a delivery of a parcel from an origin to a destination, or one or more monitoring operations within a vicinity of the origin or the destination, or in areas between the origin and the destination. The aerial vehicles or imaging devices of the present disclosure are not limited to any of missions or embodiments disclosed herein. Alternatively, the desired change may have been previously determined in accordance with any other operational requirement or restriction.

At box 330, instructions for effecting the desired change in course, speed and/or altitude on the aerial vehicle are determined. For example, instructions may be generated for causing one or more propulsion motors to increase or decrease their operating speeds, to start or stop their operations, to vary their gimbal angles, or to take any other operational action to effectuate one or more of the desired changes. Instructions may also be generated for causing one or more control surfaces to extend or deflect by desired distances or angles, or to take any other operational action to effectuate one or more of the desired changes. Instructions may be further provided to any other systems aboard the aerial vehicle, as necessary, to effectuate one or more of the desired changes. Moreover, when many aerial vehicles change their courses, speeds or altitudes, changes in one or more of a yaw angle, a pitch angle or a roll angle of the aerial vehicles are observed. In some aerial vehicles, however, a change in course, speed or altitude may be effectuated without changing a yaw angle, a pitch angle or a roll angle.

At box 340, information regarding the effect of the change in the course, the speed and/or the altitude of the aerial vehicle is provided to the imaging device. Where the imaging device is fixed in its position or angular orientation with respect to the aerial vehicle, the change in the course, the speed and/or the altitude of the aerial vehicle will cause the contents of the field of view of the imaging device to change accordingly. Unless the aerial vehicle hovers, or remains in a fixed position and at a constant altitude, the contents of the field of view will change over time, to at least some degree. In some embodiments, the effects of the change in the course, the speed and/or the altitude on the aerial vehicle may be calculated by a control system (e.g., a flight controller) or one or more processors or processor units aboard the aerial vehicle, or external to the aerial vehicle, and provided to the imaging device. In some embodiments, however, the effects of the change in the course, the speed and/or the altitude may be calculated by one or more processors aboard the imaging device. In some embodiments, effects of a change may be considered in the aggregate, e.g., based on the change in its entirety. Alternatively, in some embodiments, effects of the change may be considered on a differential basis, such as based on one or more intervals of the overall change, which may be defined on any basis, including but not limited to one or more attributes or variables of the imaging device (e.g., a shutter speed of the imaging device).

At box 350, a portion of the first image that is expected to remain within the field of view of the imaging device following the change in the course, the speed and/or the altitude of the imaging device is selected. The portion of the first image may be selected based on the change in the course, the speed and/or the altitude in the aggregate, e.g., in its entirety, or based on a time when the imaging device will capture another image, or a rate at which the imaging device is configured to capture images.

For example, when the aerial vehicle turns left or right (e.g., by roll or yaw), by an amount less than the field of view of the imaging device, portions of the first image on a left side or a right side, respectively, are likely to remain within the field of view after the change, or a portion of the change, is complete. Where the field of view extends forward of the aerial vehicle, and the aircraft increases or decreases its altitude, portions of the first image on an upper side or a lower side, respectively, are likely to remain within the field of view after the change, or a portion of the change, is complete. Where the field of view extends below the aerial vehicle, and the aircraft increases its altitude, portions around a perimeter of the first image are likely to remain within the field of view after the change, or a portion of the change, is complete. Where the field of view extends below the aerial vehicle, and the aircraft decreases its altitude, however, a centroid or central portion of the first image is likely to remain within the field of view after the change, or a portion of the change, is complete. Where the aerial vehicle is engaged in a hovering operation, the field of view is not likely to change, the entire first image may be selected. Alternatively, where a change in course, speed or altitude is likely to cause the field of view not to include any portion of the first image following the change in the course, the speed and/or the altitude, a portion of the first image that is most likely similar to or consistent with background features or contents that will likely be present within the field of view may be selected.

At box 360, the imaging device is configured based on the selected portion of the first image. For example, brightness or intensities of one or more pixels of the selected portion may be determined, e.g., by calculating a histogram of such brightness or intensities, either a black-and-white histogram or a color histogram over two or more channels, such as a red channel histogram, a green channel histogram and a blue channel histogram, and other portions of the first image may be disregarded. Any other image processing techniques or procedures may be calculated based on, or executed on, the selected portion of the first image, or on the first image as a whole, such as by normalizing or equalizing one or more histograms, or segmenting or partitioning the first image or the selected portion based on one or more histograms, in accordance with the present disclosure. Based on the brightness or intensities, or the one or more histograms, or on results or outcomes of any image processing techniques or procedures, one or more attributes or variables of the imaging device may be selected. For example, in some embodiments, an exposure time, a shutter speed, an aperture setting or a focal ratio (or f-number) of the imaging device, or a level of gain to be applied by the imaging device to imaging data captured thereby, may be selected. In some other embodiments, a level of focus or a focal length may also be selected.

At box 370, the desired change in the course, the speed or the altitude of the aerial vehicle identified at box 320 is executed. In some embodiments, the change may have been identified at box 320 based on one or more instructions provided to propulsion motors and/or control surfaces generated by a control system, and the change may be executed by the propulsion motors and/or control surfaces at box 370. In some other embodiments, the change may have been identified at box 320 in any other manner, e.g., based on information or data derived based on instructions to be provided to the propulsion motors and/or the control surfaces, or from a transit plan or mission plan, and one or more instructions for implementing the change may be executed at box 370. At box 380, a second image is captured by the imaging device with the vehicle operating on a second course, at a second speed or at a second altitude, and the process ends. Alternatively, in some embodiments, a second image may be captured while the aerial vehicle is executing the change in the course, the speed or the altitude, such as where the imaging device is programmed or configured to capture images in series, and before the change is complete.

As is discussed above, an imaging device may be configured based on control signals or other information or data regarding the operation of any vehicle or structure to which the imaging device is mounted, e.g., an aerial vehicle. Referring to FIGS. 4A through 4E, views of aspects of one system for configuring imaging devices based on control signals in accordance with embodiments of the present disclosure are shown. Except where otherwise noted, reference numerals preceded by the number "4" shown in FIGS. 4A through 4E indicate components or features that are similar to components or features having reference numerals preceded by the number "2" shown in FIG. 2 or by the number "1" shown in FIGS. 1A through 1H.

Figure 4A:
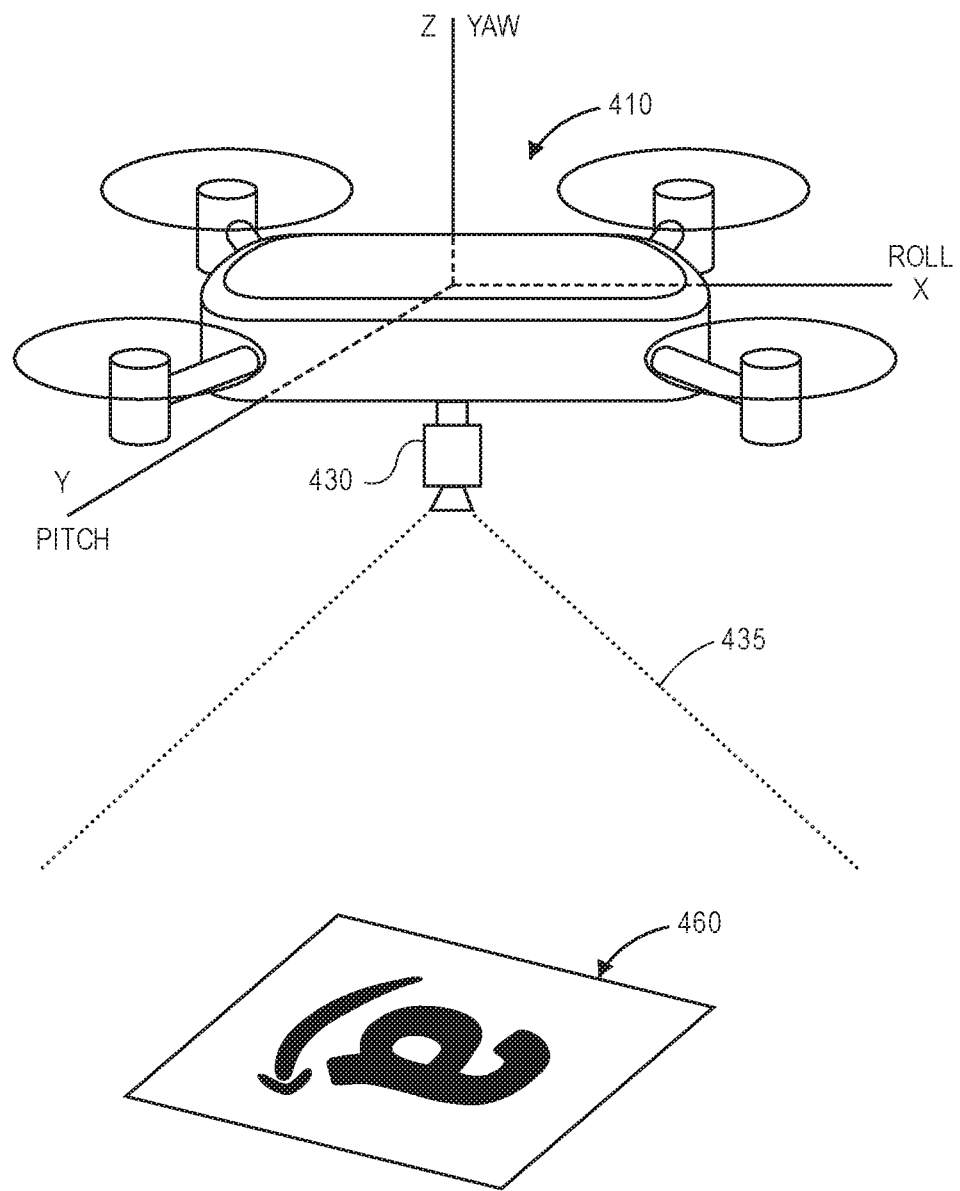
FIGS. 4A through 4E are views of aspects of one system for configuring imaging devices based on control signals in accordance with embodiments of the present disclosure.

As is shown in FIG. 4A, an aerial vehicle 410 includes an imaging device 430 having a field of view 435 defined by one or more lenses, sensors and/or other components. The aerial vehicle 410 is configured for travel about one or more of an x-axis (or roll axis), a y-axis (or pitch axis) or z-axis (or yaw axis). As is further shown in FIG. 4A, the field of view 435 is aligned substantially vertically downward, e.g., along the z-axis (or yaw axis), or parallel to the z-axis (or yaw axis). A ground-based marker 460 lies within the field of view 435.

The marker 460 may take the form of a mat, a tarp, a sheet or any other covering that may be laid upon a surface, e.g., by one or more personnel or machines, in a location where a landing of the aerial vehicle 410 is desired. The marker 460 may be formed from any material that is flexible and sufficiently durable, including but not limited to natural or synthetic fibers (e.g., woven or non-woven fibers) or other substrates, in order to provide an interface between the marker 460 and a surface upon which the marker 460 is applied. In some other embodiments, the marker 460 may be formed from paint, ink, chalk or any other materials. The marker 460 may further include one or more alphanumeric characters, symbols, bar codes (e.g., one-dimensional or two-dimensional bar codes, such as "QR" codes) or other markings or indicia that may be recognized by one or more sensors aboard the aerial vehicle 410, including but not limited to the imaging device 430. In still other embodiments, the marker 460 may be a natural or previously existing object or artifact, e.g., a parking space or an identifier thereof; a utility structure such as a manhole cover, a water main valve cover, or the like.

Figure 4B:
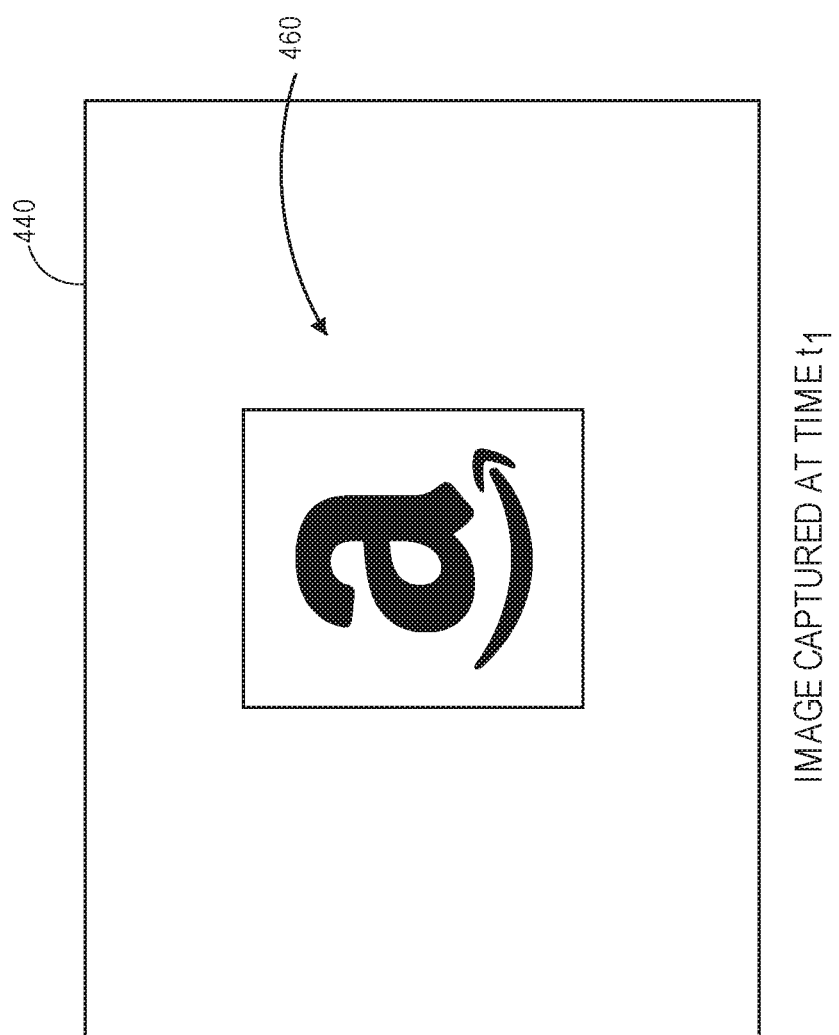

As is shown in FIG. 4B, an image 440 captured by the imaging device 430 at time e.g., in the position and orientation shown in FIG. 4A, is shown. The image 440 depicts the marker 460 below the aerial vehicle 410, as shown in FIG. 4A.

In accordance with the present disclosure, where the aerial vehicle 410 is engaged in vertical (or substantially vertical) flight operations, the imaging device 430 may be configured based on one or more portions of an image captured thereby, and information or data (e.g., control signals) indicative of a subsequent position or orientation of the imaging device 430. For example, a portion of an image captured with the imaging device 430 in a first position or a first orientation that is determined to likely appear within the field of view 435 when the imaging device 430 is in a second position or a second orientation, or is determined to be similar to or consistent with expected contents of the field of view of the imaging device 430, may be used to select one or more attributes or variables of the imaging device 430 for capturing imaging data in the second position or the second orientation.

Figure 4C:
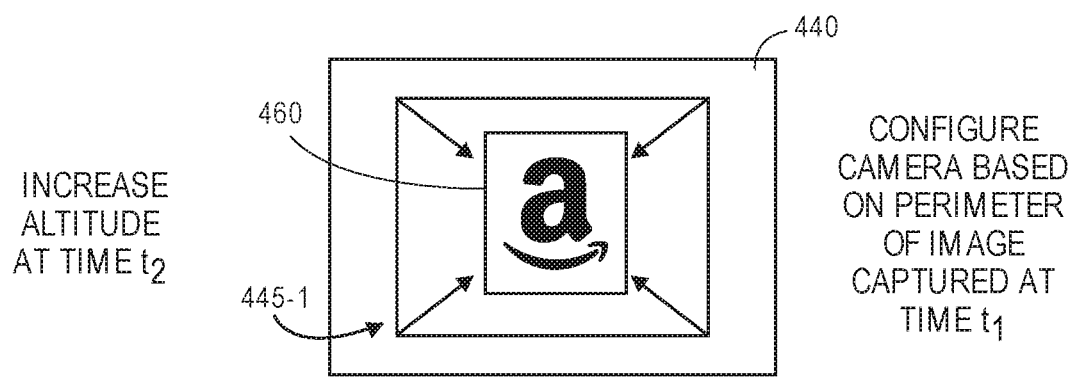

As is shown in FIG. 4C, when the aerial vehicle 410 is programmed or instructed to increase its altitude (e.g., ascend) at time $t_2$, or has increased its altitude prior to time $t_2$, the imaging device 430 may be configured based on contents of a perimeter 445-1 of the image 440 captured at time $t_1$, which are expected to remain within or predominate the field of view 435 as the aerial vehicle 410 rises over the marker 460. In some embodiments, in order to optimize the exposure of the imaging device 430 at the time $t_2$ based on the perimeter 445-1 of the image 440 captured at the time $t_1$, a histogram or other analysis of the brightness or intensities of the perimeter 445-1 may be performed, and a balance of the image 440, e.g., a central portion of the image 440, may be disregarded. One or more attributes or variables of the imaging device 430 at time $t_2$, e.g., an exposure time or shutter speed, an aperture setting or focal ratio, or a gain, may be selected based on the histogram or the other analysis of the contents of the perimeter 445-1.

Figure 4D:

Similarly, as is shown in FIG. 4D, when the aerial vehicle 410 is programmed or instructed to hover at time $t_2$, the imaging device 430 may be configured based on a region 445-2 including all or substantial portions of the image 440 captured at time $t_1$. In some embodiments, because the position and/or orientation of the imaging device 430 is not expected to change at time $t_2$, one or more attributes or variables for the imaging device 430 may be selected based on the image 440 in its entirety. Alternatively, in some other embodiments, such attributes or variables may be selected based on the portion 445-2 of the image 440 less a nominal buffer about a perimeter of the image 440, to account for any detected, predicted or unanticipated drift or wind gusts, as well as feedback or time delays between detecting such drift or gusts and generating one or more signals in response, or other factors. A size of the buffer about the perimeter of the image 440 that is to be disregarded may be selected based on the detected, predicted or unanticipated drift or wind gusts.

Figure 4E:
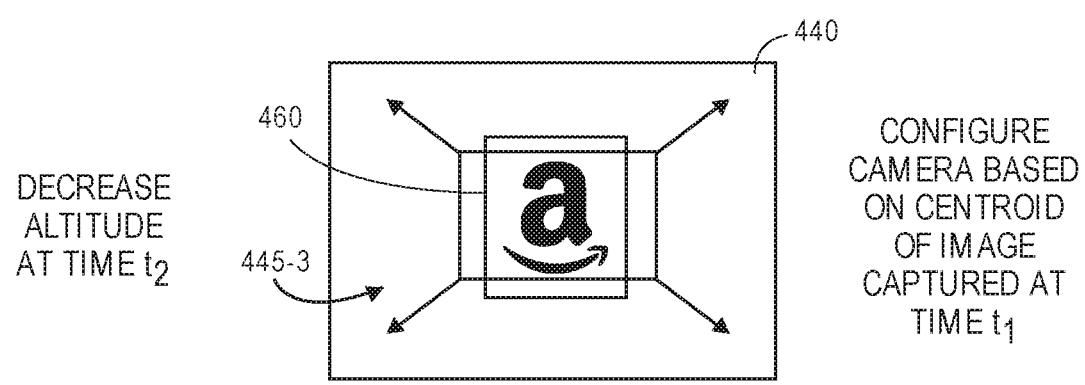

As is shown in FIG. 4E, when the aerial vehicle 410 is programmed or instructed to decrease its altitude (e.g., descend) at time $t_2$, or has decreased its altitude prior to time $t_2$, the imaging device 430 may be configured based on contents of a centroid 445-3 (or central region) of the image 440 captured at time $t_1$, which are expected to remain within or predominate the field of view 435 as the aerial vehicle 410 descends toward the marker 460. As the aerial vehicle 410 descends, the centroid 445-3 of the image 440, e.g., all or substantial portions of the marker 460, are expected to grow or expand within the field of view 435. Therefore, in some embodiments, one or more attributes or variables of the imaging device 430 at time $t_2$, e.g., an exposure time or shutter speed, an aperture setting or focal ratio, or a gain, may be selected based on a histogram or another analysis of the contents of the centroid 445-3.

In accordance with some embodiments of the present disclosure, imaging devices that are aligned in any orientation (e.g., horizontal, lateral or vertical) with respect to an orientation of a vehicle, such as an aerial vehicle, may be configured based on contents of images captured by the imaging devices and control signals for operating the vehicle. In particular, an imaging device mounted to an aerial vehicle with a substantially forward field of view may be configured based on control signals for the aerial vehicle in accordance with the present disclosure.

Referring to FIGS. 5A through 5G, views of aspects of one system for configuring imaging devices based on control signals in accordance with embodiments of the present disclosure are shown. Except where otherwise noted, reference numerals preceded by the number "5" shown in FIGS. 5A through 5G indicate components or features that are similar to components or features having reference numerals preceded by the number "4" shown in FIGS. 4A through 4E, by the number "2" shown in FIG. 2 or by the number "1" shown in FIGS. 1A through 1H.

Figure 5A:
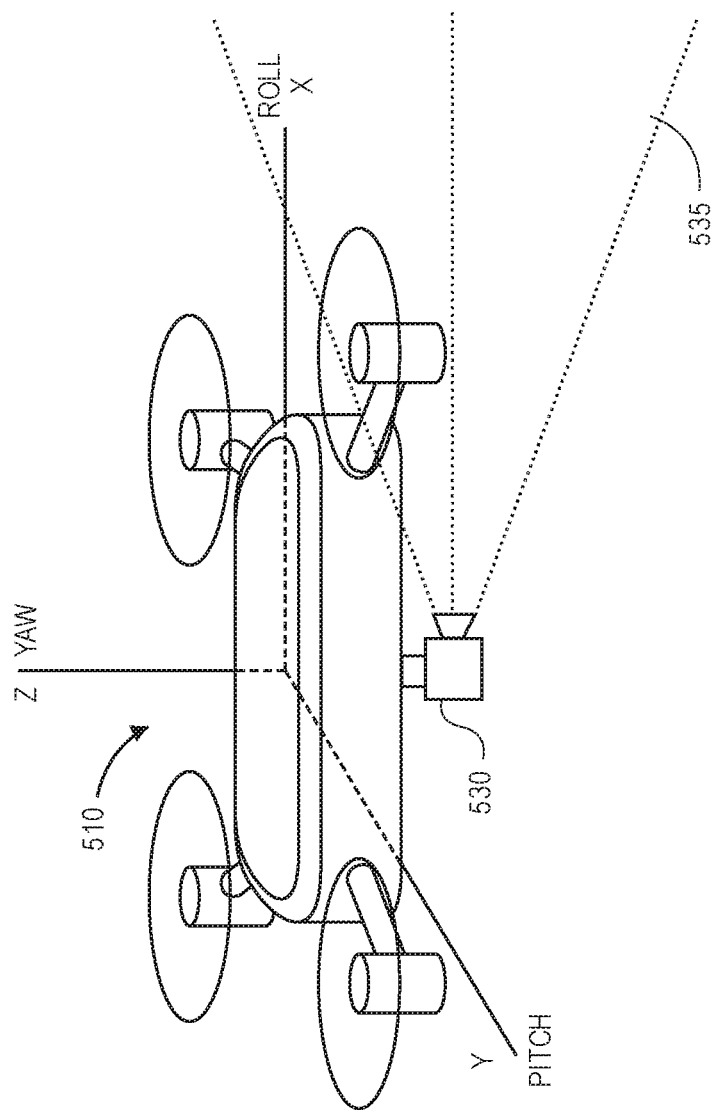

As is shown in FIG. 5A, an aerial vehicle 510 includes an imaging device 530 having a field of view 535 defined by one or more lenses, sensors and/or other components. The aerial vehicle 510 is configured for travel about one or more of an x-axis (or roll axis), a y-axis (or pitch axis) or z-axis (or yaw axis). As is further shown in FIG. 5A, the field of view 535 is aligned substantially forward of the aerial vehicle 510, e.g., along the x-axis (or roll axis), or parallel to the x-axis (or roll axis). As is shown in FIG. 5B, an image 540 captured by the imaging device 530 at time $t_1$, e.g., in the position and orientation shown in FIG. 5A, is shown. The image 540 depicts one or more objects 560-1, 560-2, 560-3, 560-4, including a celestial object 560-1 (viz., the Sun), airborne objects 560-2, 560-3 (viz., aerial vehicles) and a ground-based object 560-4 (viz., plant life).

In accordance with the present disclosure, where the aerial vehicle 510 is engaged in forward (or substantially forward) flight operations, the imaging device 530 may be configured based on one or more portions of an image captured thereby, and information or data (e.g., control signals) indicative of a subsequent position or orientation of the imaging device 530.

Figure 5C:
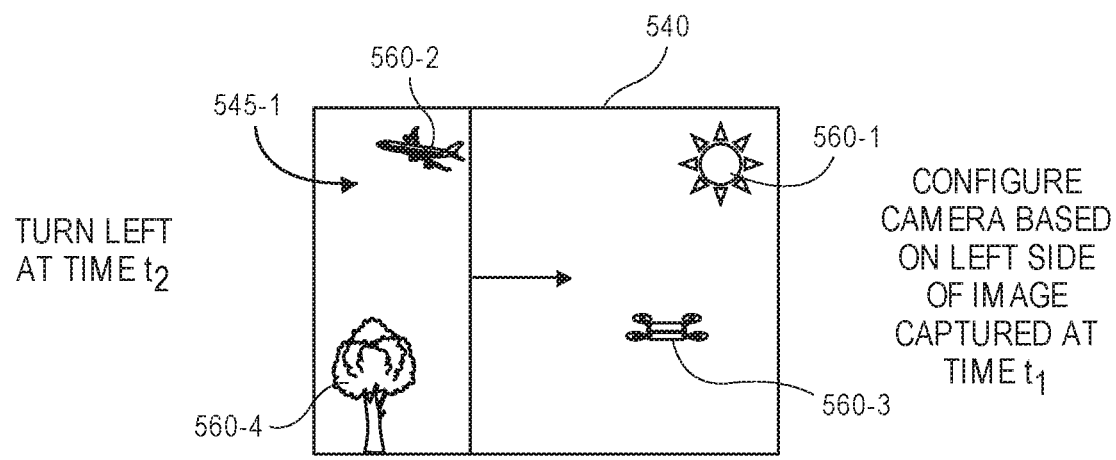
Figure 5D:
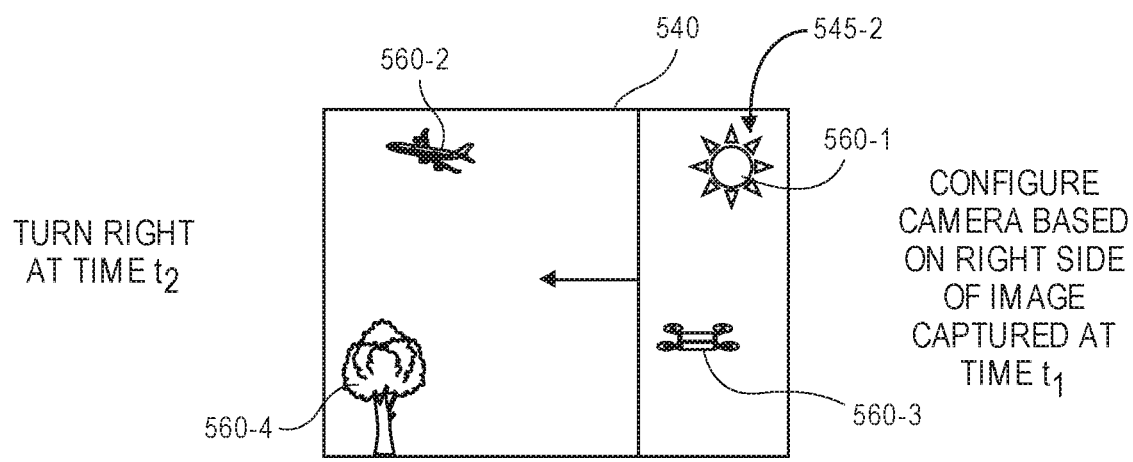

As is shown in FIG. 5C, when the aerial vehicle 510 is programmed or instructed to turn left at time $t_2$, or has turned left prior to time $t_2$, the imaging device 530 may be configured based on contents of a left side 545-1 of the image 540 captured at time $t_1$, e.g., sky and/or the airborne object 560-2 or the plant life 560-4, which are expected to remain within or predominate the field of view 535 as the aerial vehicle 510 turns left (e.g., about the yaw axis and/or roll axis). Therefore, one or more attributes or variables of the imaging device 530 at time $t_2$, e.g., an exposure time or shutter speed, an aperture setting or focal ratio, or a gain, may be selected based on a histogram or another analysis of the contents of the left side 545-1. Similarly, as is shown in FIG. 5D, when the aerial vehicle 510 is programmed or instructed to turn right at time $t_2$, or has turned right prior to time $t_2$, the imaging device 530 may be configured based on contents of a right side 545-2 of the image 540 captured at time $t_1$, e.g., the celestial object 560-1 or the airborne object 560-3, which are expected to remain within or predominate the field of view 535 as the aerial vehicle 510 turns right (e.g., about the yaw axis and/or roll axis).

Figure 5E:
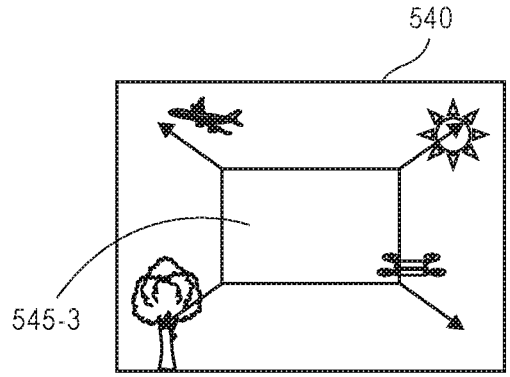

As is shown in FIG. 5E, where the aerial vehicle 510 is programmed or instructed to travel without a change in course or altitude at time $t_2$, or has traveled without a change in course or altitude at time $t_2$, the imaging device 430 may be configured based on contents of a centroid 545-3 (or central region) of the image 540 captured at time $t_1$, which are expected to remain within or predominate the field of view 535 as the aerial vehicle 510 travels forward. Portions of the image 540 located outside the centroid 545-3 will depart from the field of view 535 as the aerial vehicle 510 travels forward.

Figure 5F:
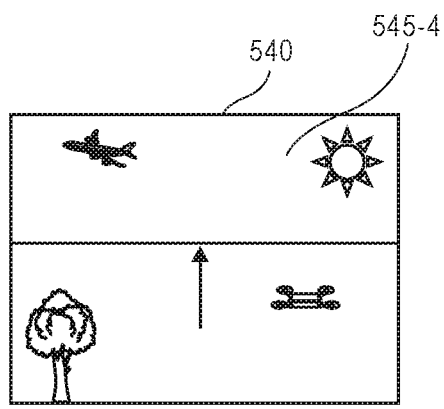
Figure 5G:
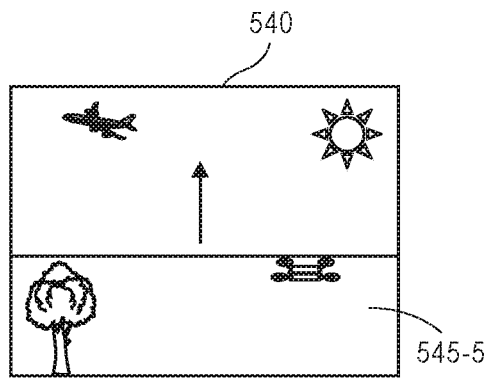

As is shown in FIG. 5F, when the aerial vehicle 510 is programmed or instructed to increase its altitude at time $t_2$, or has increased its altitude prior to time $t_2$, the imaging device 530 may be configured based on contents of an upper side 545-4 of the image 540 captured at time e.g., sky and/or the airborne object 560-2 or the celestial object 560-1, which are expected to remain within or predominate the field of view 535 as the aerial vehicle 510 ascends (e.g., about the pitch axis). Therefore, one or more attributes or variables of the imaging device 530 at time $t_2$, e.g., an exposure time or shutter speed, an aperture setting or focal ratio, or a gain, may be selected based on a histogram or another analysis of the contents of the upper side 545-4. Similarly, as is shown in FIG. 5G, when the aerial vehicle 510 is programmed or instructed to decrease its altitude at time $t_2$, or has decreased its altitude prior to time $t_2$, the imaging device 530 may be configured based on contents of a lower side 545-5 of the image 540 captured at time $t_1$, e.g., the plant life 560-4 or the airborne object 560-3, which are expected to remain within or predominate the field of view 535 as the aerial vehicle 510 descends (e.g., about the pitch axis).

In some embodiments, an imaging device may be adjusted based on portions of images captured thereby and information or data (e.g., control signals) regarding changes in position or orientation that are both vertical and horizontal or lateral in nature, under conditions described above in connection with one or more of FIGS. 4C through 4E and/or one or more of FIGS. 5C through 5G. A portion of an image, such as the portion 145-1 of the image 140-1 as shown in FIG. 1E, may be selected based on aspects of vertical and/or horizontal motion in accordance with the present disclosure.

Furthermore, in some embodiments, where an image such as the image 540 of FIG. 5B is determined to include one or more objects in motion, such as the celestial object 560-1, the aerial vehicle 560-2 or the aerial vehicle 560-3, a portion of the image may be selected based at least in part on the motion of such objects. For example, where an object such as the aerial vehicle 560-2 is in motion at a sufficiently high speed, or is traveling across the field of view 535 of the imaging device 530 at a sufficiently high bearing rate, a portion of the image 540 may be selected based at least in part on one or more aspects of the motion of the aerial vehicle 560-2, including but not limited to a determination as to whether the aerial vehicle 560-2 will be within the field of view 535 when another image is captured using the imaging device 530, without regard to whether the aerial vehicle 510 and/or the imaging device 530 are in motion.

Additionally, in some embodiments, an imaging device may be adjusted based on portions of any image previously captured thereby, and not necessarily based on portions of an image most recently captured thereby. For example, where an aerial vehicle is engaged in forward flight substantially parallel to the surface of the Earth, e.g., at a zero-pitch angle, and executes a change in altitude, the aerial vehicle may experience a non-zero pitch angle for a period of time during the change in altitude, before ultimately returning to a zero-pitch angle upon arriving at a desired altitude. Portions of images captured at a zero-pitch angle prior to executing the change in altitude may be selected and used to adjust one or more attributes or variables of the imaging device for the capture of images when the aerial vehicle returns to the zero-pitch angle.

In some embodiments, a first imaging device may be adjusted based on portions of images captured by a second imaging device and information or data (e.g., control signals) regarding changes in position or orientation of the first imaging device. For example, where portions of an image captured by the second imaging device are determined to likely appear within a field of view of the first imaging device, based on the control signals, one or more attributes or variables, e.g., an exposure time, a shutter speed, an aperture setting or a focal ratio (or f-number), or a level of gain, may be selected for the first imaging device based on such portions of the image captured by the second imaging device.

Figure 6:
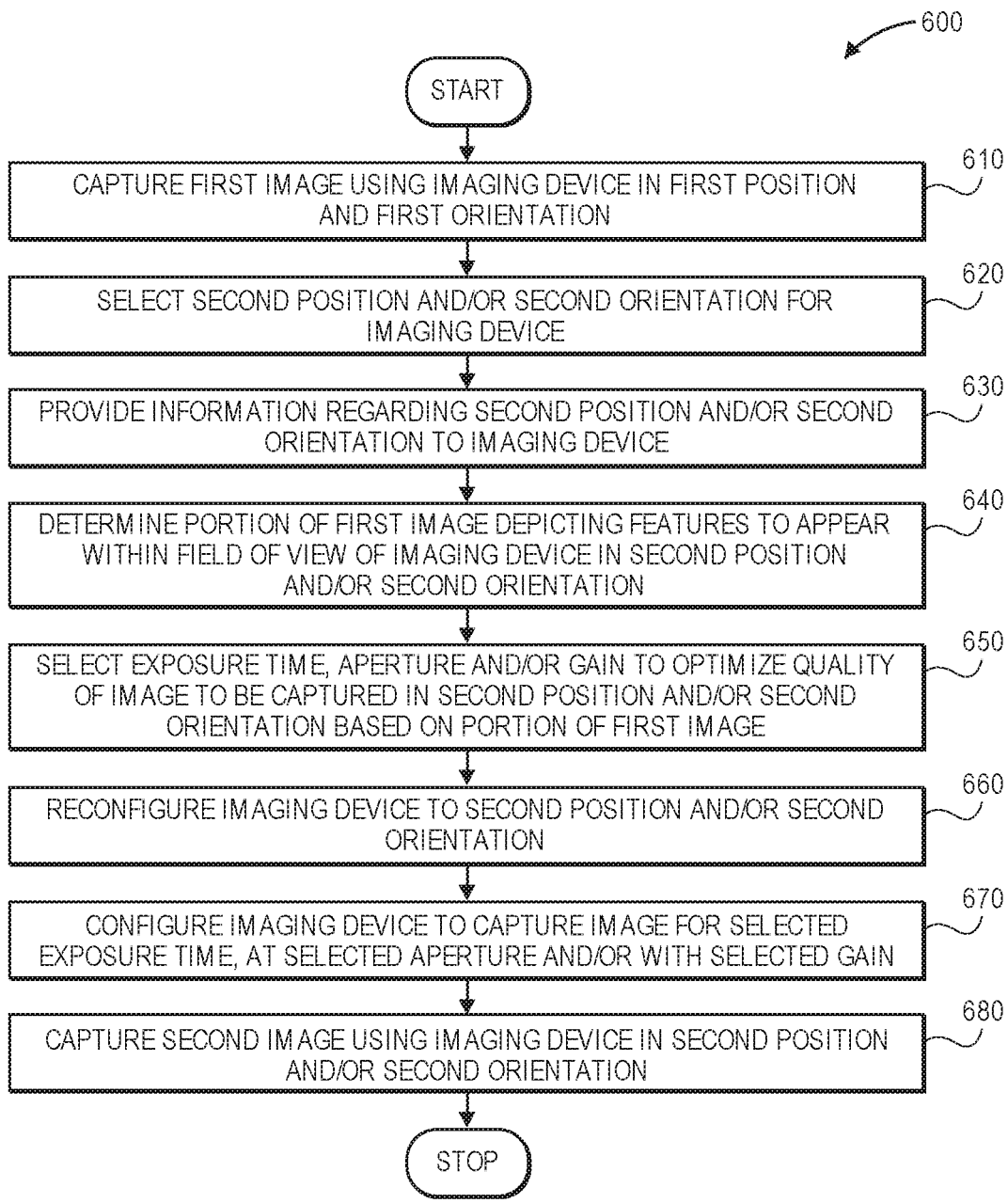
FIG. 6 is a flow chart of one process for configuring imaging devices based on control signals in accordance with embodiments of the present disclosure.

Referring to FIG. 6, a flow chart 600 of one process for configuring imaging devices based on control signals in accordance with embodiments of the present disclosure is shown. At box 610, a first image is captured using an imaging device in a first position and a first orientation. The imaging device may be mounted to or otherwise provided aboard an aerial vehicle, or any other vehicle (e.g., a ground-based or seagoing vehicle) or structure (e.g., a fixed or mobile mount). At box 620, a second position and/or a second orientation for the imaging device are selected. In some embodiments, e.g., where the imaging device is mounted to an aerial vehicle or another type of vehicle, the second position and/or the second orientation may be selected or determined based on one or more control signals to be provided to the aerial vehicle or other vehicle for causing a change in the position and/or orientation of the aerial vehicle or other vehicle. In some other embodiments, the second position and/or the second orientation may be selected or determined based on a requested or desired change in the position or the orientation of the imaging device or a structure to which the imaging device is mounted.

At box 630, information regarding the second position and/or the second orientation of the aerial vehicle is provided to the imaging device. For example, the information may include, or may be derived from, one or more control signals provided to a vehicle or structure to which the imaging device is mounted, in order to cause the vehicle or structure to move from the first position to the second position or to cause the imaging device to be reoriented from the first orientation to the second orientation. In some embodiments, such information and/or control signals may be generated by a control system (e.g., a flight controller) and provided to the imaging device and/or one or more propulsion motors, control surfaces or other components for causing a change in position or orientation. In some other embodiments, such information and/or control signals may be generated by one or more processors or processor-driven units that are external to the vehicle or structure to which the imaging device is mounted.

At box 640, a portion of the first image that depicts features that will appear within a field of view of the imaging device in the second position and/or the second orientation are determined. For example, where a change in a position or an orientation of a vehicle or structure to which the imaging device is mounted is known, e.g., based on the information provided to the imaging device at box 630, a portion of the first image that depicts background portions or features of a scene that are likely to appear within the field of view of the imaging device with the imaging device in the second position or the second orientation may be selected based on the extent of the change from the first position to the second position and/or a change from the first orientation to the second orientation, as well as a rate at which either of the changes is implemented, or any other factor.

At box 650, an exposure time, an aperture setting and/or a gain of the imaging device are selected in order to optimize a level of quality of an image to be captured with the imaging device in the second position and/or the second orientation based on the portion of the first image. Those of ordinary skill in the pertinent arts will recognize that a level of exposure may be varied by varying one or more of the exposure time (or shutter speed), the aperture setting (e.g., the focal ratio or f-number) and/or the gain. Because the portion of the first image determined at box 640 includes content that is likely to appear within imaging data subsequently captured by the imaging device, such attributes or variables of the imaging device may be selected based on this portion of the first image, and other portions of the first image may be disregarded. In some embodiments, the attributes or variables of the imaging device may be selected by an exposure algorithm executed by one or more processors provided on the imaging device, or one or more processors or processor units external to the imaging device.

At box 660, the imaging device is realigned to the second position and/or the second orientation. For example, when the imaging device is mounted to a vehicle, such as an aerial vehicle, the imaging device may be realigned to the second position or the second orientation by motion of the vehicle. Where the imaging device is mounted to a structure other than a vehicle, the imaging device may be realigned by one or more motors or other systems for translating the imaging device in a direction of one or more axes, or about the one or more axes.

At box 670, the imaging device is configured to capture one or more images for the selected exposure time, at the selected aperture setting and/or with the selected gain, e.g., by one or more processors or processor-driven units of the imaging device, or external to the imaging device. At box 680, a second image is captured using the imaging device in the second position and/or the second orientation, as configured at box 670, and the process ends.

As is discussed above, control signals indicative of a change in a position or orientation of a first imaging device may be used to identify a portion of an image captured by a second imaging device that is likely to appear within a field of view of the first imaging device following the change in the position or orientation. One or more attributes or variables of the first imaging device may be selected based on the portion of the image captured by the second imaging device and utilized in controlling the operation of the first imaging device.

Figure 7A:
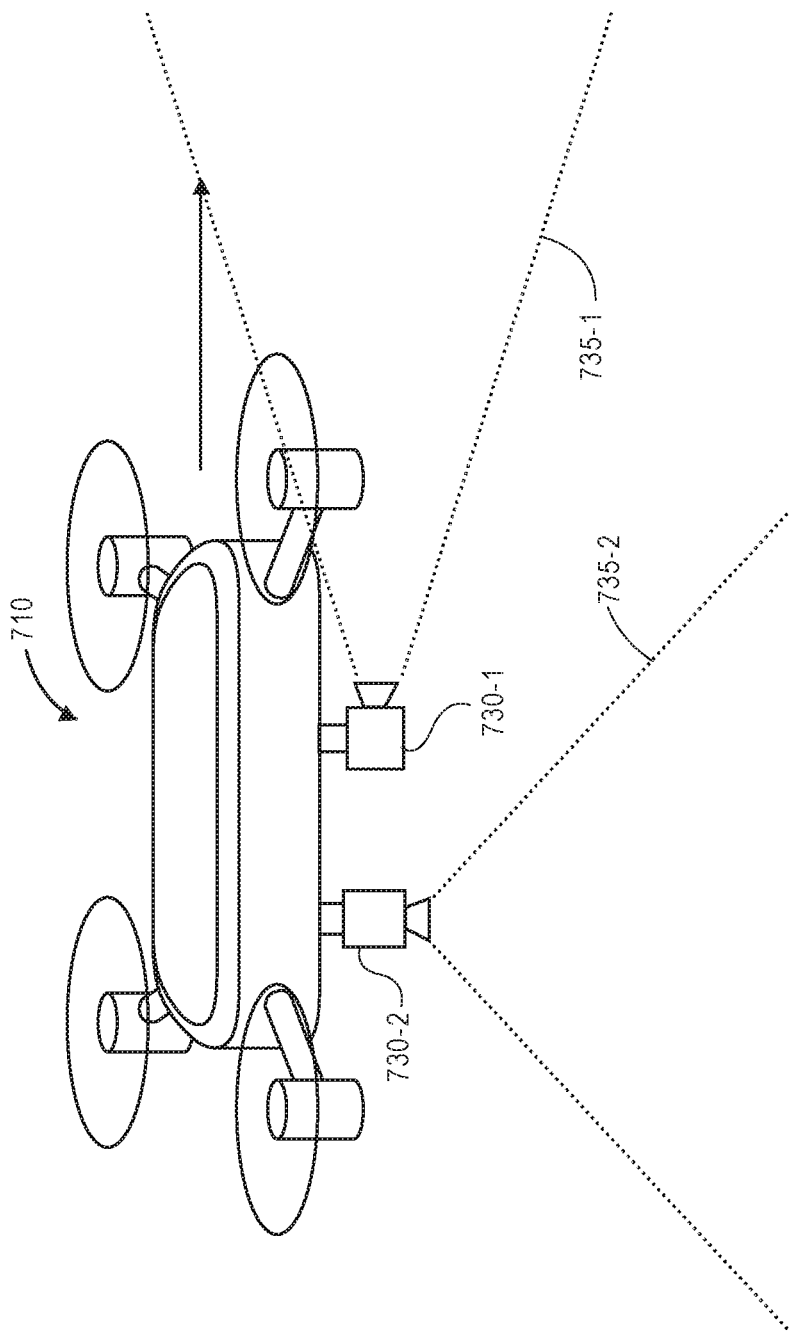
FIGS. 7A and 7B are views of aspects of one system for configuring imaging devices based on control signals in accordance with embodiments of the present disclosure.
Figure 7B:
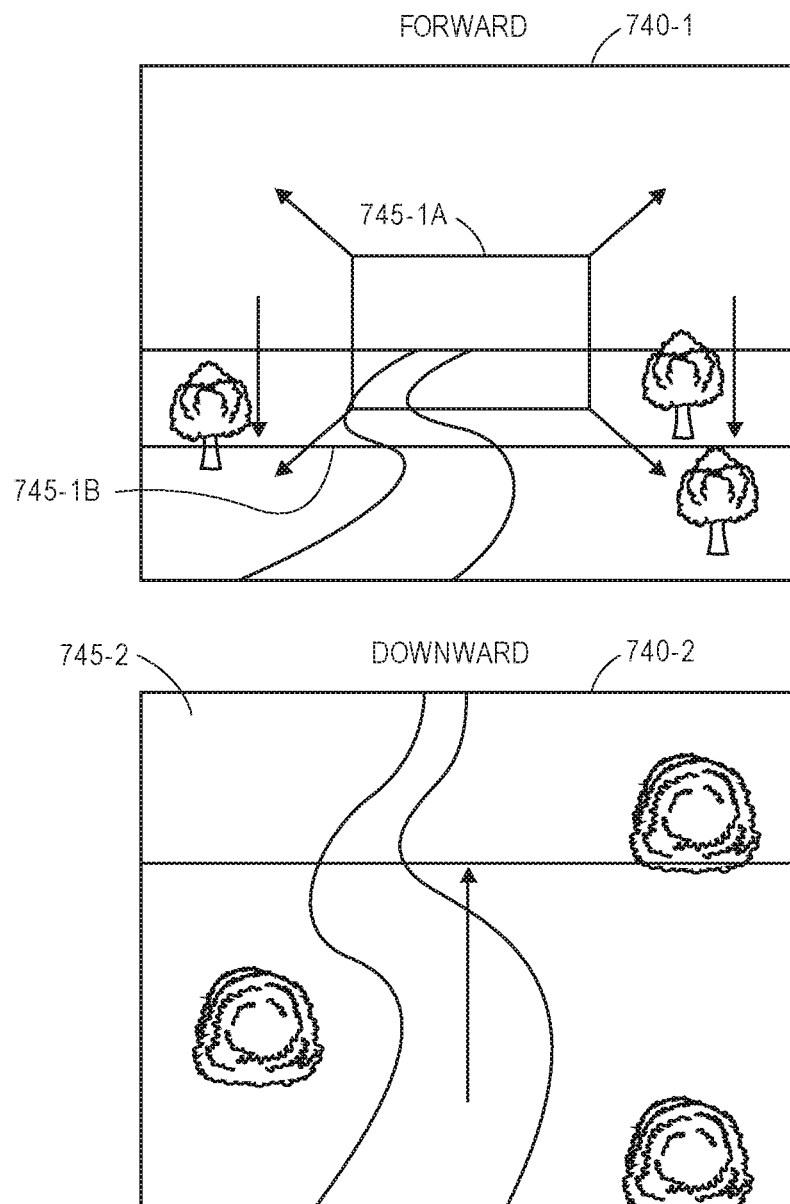

Referring to FIGS. 7A and 7B, views of one system for configuring imaging devices based on control signals in accordance with embodiments of the present disclosure are shown. Except where otherwise noted, reference numerals preceded by the number "7" shown in FIGS. 7A and 7B indicate components or features that are similar to components or features having reference numerals preceded by the number "5" shown in FIGS. 5A through 5G, by the number "4" shown in FIGS. 4A through 4E, by the number "2" shown in FIG. 2 or by the number "1" shown in FIGS. 1A through 1H.

As is shown in FIG. 7A, an aerial vehicle 710 includes a first imaging device 730-1 having a first field of view 735-1 and a second imaging device 730-2 having a second field of view 735-2. Each of the fields of view 735-1, 735-2 is defined by one or more lenses, sensors and/or other components. The aerial vehicle 710 is configured for travel about one or more of an x-axis (or roll axis), a y-axis (or pitch axis) or z-axis (or yaw axis). As is further shown in FIG. 7A, the field of view 735-1 is aligned substantially forward of the aerial vehicle 710, e.g., along the x-axis (or roll axis), or parallel to the x-axis (or roll axis), while the field of view 735-2 is aligned substantially vertically downward, e.g., along the z-axis (or yaw axis), or parallel to the z-axis (or yaw axis). As is shown in FIG. 7B, a forward image 740-1 captured by the first imaging device 730-1 and a downward image 740-2 captured by the second imaging device 730-2 are shown. Each of the images 740-1, 740-2 is captured at a time $t_1$.

In accordance with some embodiments of the present disclosure, where information or data (e.g., control signals) indicative of a change in a position or orientation of an aerial vehicle to which two or more imaging devices are mounted is known, a portion of an image captured by one of the imaging devices may be utilized, along with such information or data, to configure another of the imaging devices. Because the aerial vehicle 710 is engaged in forward flight operations, contents of a centroid 745-1A or central portion of the forward image 740-1 and contents of an upper edge 745-2 of the downward image 740-2 captured at time $t_1$ may be expected to appear within the field of view 735-1 of the forward imaging device 730-1 at a time $t_2$, as the aerial vehicle 710 travels in a forward direction, or after the aerial vehicle 710 has traveled in the forward direction. Such contents 745-1A, 745-2 may be subjected to a histogram or other analysis, and results of the histogram or other analysis may be used to determine an exposure time, a shutter speed, an aperture setting, a focal ratio or a gain to be applied by the forward imaging device 730-1 when capturing imaging data at time $t_2$. Similarly, contents of a lower edge 745-1B of the forward image 740-1 and contents of the upper side 745-2 of the downward image 740-2 captured at time $t_1$ may also be expected to appear within the field of view 735-2 of the downward imaging device 730-2 at a time $t_2$, as the aerial vehicle 710 travels in a forward direction, or after the aerial vehicle 710 has traveled in the forward direction. Such contents 745-1B, 745-2 may also be subjected to a histogram or other analysis, and results of the histogram or other analysis may be used to determine an exposure time, a shutter speed, an aperture setting, a focal ratio or a gain to be applied by the downward imaging device 730-2 when capturing imaging data at time $t_2$.

In accordance with the present disclosure, information or data indicative of motion of imaging devices that are mounted to any type or form of structure, including but not limited to a vehicle, may be determined and used to identify portions of imaging data that are likely to appear within one or more of the imaging devices during or following the motion. Referring to FIG. 8, views of components of one system for configuring imaging devices based on control signals in accordance with embodiments of the present disclosure are shown. Except where otherwise noted, reference numerals preceded by the number "8" shown in FIG. 8 indicate components or features that are similar to components or features having reference numerals preceded by the number "7" shown in FIGS. 7A and 7B, by the number "5" shown in FIGS. 5A through 5G, by the number "4" shown in FIGS. 4A through 4E, by the number "2" shown in FIG. 2 or by the number "1" shown in FIGS. 1A through 1H.

As is shown in FIG. 8, a pair of imaging devices 830-1, 830-2 are rotatably mounted atop a structure 810 (e.g., a tripod or other like structure of any height, length or width). Each of the imaging devices 830-1, 830-2 has a field of view 835-1, 835-2 defined by one or more lenses, sensors and/or other components. As is also shown in FIG. 8, the imaging devices 830-1, 830-2 are each configured to rotate about a vertical axis (or z-axis) defined by the structure 810.

In accordance with the present disclosure, where information or data (e.g., control signals) regarding the orientation of the imaging devices 830-1, 830-2 is known, the imaging device 830-1 may be configured based on portions of images captured by the imaging device 830-2, and the imaging device 830-2 may be configured based on portions of images captured by the imaging device 830-1. Because the imaging devices 830-1, 830-2 are rotating about the vertical axis (or the z-axis) in a clockwise direction, left portions of images captured by each of such imaging devices 830-1, 830-2 may be processed according to a histogram or another analysis, and results of such histograms or other analyses may be used to select an exposure time, a shutter speed, an aperture setting or a focal ratio (or f-number), or a level of gain for the other of the imaging devices 830-1, 830-2.

Figure 9:
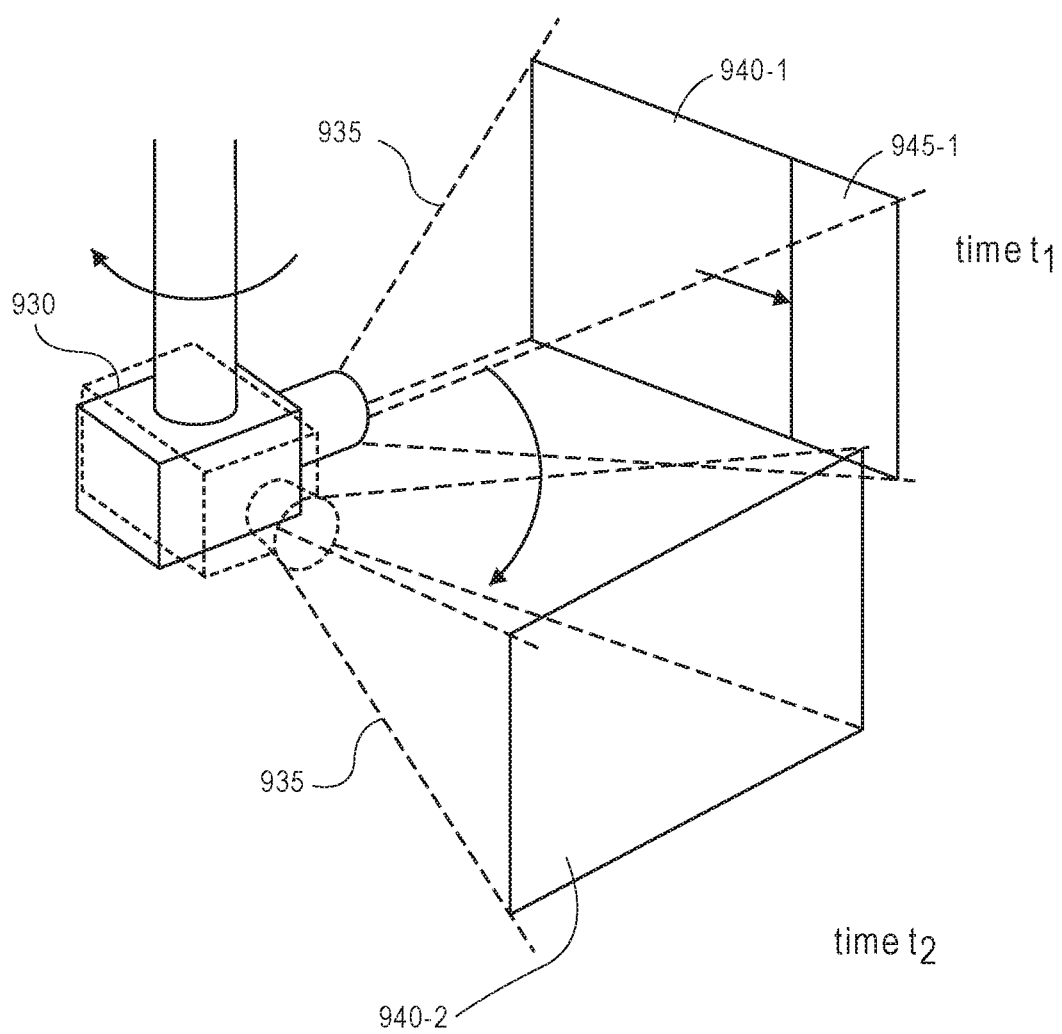
FIG. 9 is a view of aspects of one system for configuring imaging devices based on control signals in accordance with embodiments of the present disclosure.

In accordance with the present disclosure, where an imaging device is configured to translate along one or more axes, or to rotate about the one or more axes, e.g., a PTZ camera, portions of one image captured by the imaging device in one position or orientation may be identified and used to configure the imaging device prior to capturing another image. Referring to FIG. 9, views of components of one system for configuring imaging devices based on control signals in accordance with embodiments of the present disclosure are shown. Except where otherwise noted, reference numerals preceded by the number "9" shown in FIG. 9 indicate components or features that are similar to components or features having reference numerals preceded by the number "8" shown in FIG. 8, by the number "7" shown in FIGS. 7A and 7B, by the number "5" shown in FIGS. 5A through 5G, by the number "4" shown in FIGS. 4A through 4E, by the number "2" shown in FIG. 2 or by the number "1" shown in FIGS. 1A through 1H.

As is shown in FIG. 9, a PTZ digital camera 930 having a field of view 935 in a first orientation at a time $t_1$ captures an image 940-1. As the PTZ digital camera 930 rotates the field of view 935 to a second orientation, a portion 945-1 of the image 940-1 consistent with a direction of rotation from the first orientation to the second orientation is identified and used to select one or more attributes or variables of the imaging device 930 for capturing an image in the second orientation. As is also shown in FIG. 9, the PTZ digital camera 930 captures an image 940-2 at a time $t_2$ in the second orientation.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein reference imaging devices provided aboard one or more unmanned aerial vehicles, those of ordinary skill in the pertinent arts will recognize that the systems and methods disclosed herein are not so limited, and may be utilized in connection with any type or form of imaging device provided aboard any type or form of vehicle (e.g., manned or unmanned), or mounted to any type or form of fixed or mobile structure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale. In particular, the sizes of the portions of the images depicted in the drawings as being likely to appear within a field of view of an imaging device, or likely similar to or consistent with contents of the field of view, are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
   at least one propulsion motor;
   an imaging device comprising a lens and a sensor;
   at least one memory component; and
   at least one computer processor in communication with the at least one propulsion motor, the imaging device and the at least one memory component,
   wherein the at least one computer processor is configured to execute instructions for performing a method comprising:
      capturing a first image by the imaging device at a first time, wherein the first image is captured with the imaging device operating at a first shutter speed, a first aperture and a first gain, and wherein the aerial vehicle is traveling on a first course and at a first altitude at the first time:
      selecting at least one of a second course or a second altitude for the aerial vehicle;
      identifying a portion of the first image based at least in part on the at least one of the second course or the second altitude;
      determining intensities of pixels within the portion of the first image;
      selecting at least one of a second shutter speed, a second aperture or a second gain for the imaging device based at least in part on the intensities of the pixels within the portion of the first image;
      causing the aerial vehicle to travel at one or more of the second course or the second altitude; and
      capturing a second image by the imaging device at a second time, wherein the second image is captured with the imaging device operating at the at least one of the second shutter speed, the second aperture or the second gain.

2. The aerial vehicle of claim 1, wherein determining the intensities of the pixels within the portion of the first image comprises:
   calculating a histogram of the intensities of at least the portion of the first image; and
   selecting the at least one of the second shutter speed, the second aperture or the second gain based at least in part on the histogram.

3. The aerial vehicle of claim 1, wherein the imaging device is aligned along or parallel to a roll axis of the aerial vehicle,
   wherein the field of view of the imaging device extends forward of the aerial vehicle, and
   wherein selecting the at least one of the second course or the second altitude for the aerial vehicle comprises:
      selecting the second course for the aerial vehicle; and
      generating an instruction for causing the aerial vehicle to turn in a selected direction from the first course to the second course, and
   wherein identifying the portion of the first image comprises:
      identifying a portion of the first image on a selected side of the first image based at least in part on the instruction, wherein the selected side corresponds to the selected direction.

4. The aerial vehicle of claim 1, wherein the imaging device is aligned along or parallel to a yaw axis of the aerial vehicle,
wherein the field of view of the imaging device extends below the aerial vehicle, and
wherein selecting the at least one of the second course or the second altitude for the aerial vehicle comprises:
selecting the second altitude for the aerial vehicle; and
generating an instruction for causing the aerial vehicle to travel in a selected direction from the first altitude to the second altitude, and
wherein identifying the portion of the first image comprises one of:
identifying a centroid of the first image if the second altitude is less than the first altitude; or
identifying a perimeter of the first image if the second altitude is greater than the first altitude.

5. A computer-implemented method comprising:
identifying a first image captured at a first time by at least one imaging device provided aboard an aerial vehicle, wherein the aerial vehicle is in at least one of a first position or a first orientation at the first time;
determining information regarding at least one of a second position or a second orientation of the aerial vehicle;
selecting a portion of the first image based on the at least one of the second position or the second orientation;
performing an intensity analysis of at least the portion of the first image;
configuring the at least one imaging device based at least in part on the selected portion intensity analysis and the information regarding the at least one of the second position or the second orientation;
causing the aerial vehicle to be in at least one of the second position or the second orientation at or prior to a second time; and
capturing a second image by the at least one imaging device at the second time.

6. The computer-implemented method of claim 5, wherein, at the first time, the aerial vehicle is at least one of:
traveling on a first course;
traveling at a first speed; or
traveling at a first altitude; and
wherein causing the aerial vehicle to be in at least one of the second position or the second orientation at or prior to the second time comprises:
transmitting, by a control system aboard the aerial vehicle, at least one instruction to at least one of a propulsion motor of the aerial vehicle or a control surface of the aerial vehicle; and
in response to the at least one instruction,
operating the at least one of the propulsion motor or the control surface to cause the aerial vehicle to at least one of:
travel on a second course;
travel at a second speed; or
travel at a second altitude.

7. The computer-implemented method of claim 6, wherein determining the information regarding the at least one of the second position or the second orientation comprises:
transmitting, by the control system, the at least one instruction to at least one processor unit associated with the at least one imaging device,
wherein the information regarding the at least one of the second position or the second orientation is determined by at least one processor unit associated with the at least one imaging device based at least in part on the at least one instruction.

8. The computer-implemented method of claim 5, wherein the first image is captured with the at least one imaging device operating at a first shutter speed or with a first focal ratio, and
wherein configuring the at least one imaging device based at least in part on the selected portion of the first image and the information regarding the at least one of the second position or the second orientation comprises:
selecting one of a second shutter speed or a second focal ratio based at least in part on the selected portion of the first image; and
configuring the at least one imaging device to operate at the second shutter speed or with the second focal ratio,
wherein the second image is captured with the at least one imaging device operating at the second shutter speed or with the second focal ratio.

9. The computer-implemented method of claim 5, wherein a first level of gain is applied to the first image, and
wherein configuring the at least one imaging device based at least in part on the selected portion of the first image and the information regarding the at least one of the second position or the second orientation comprises:
selecting a second level of gain based at least in part on the selected portion of the first image, and
wherein the computer-implemented method of claim 5 further comprises:
applying the second level of gain to the second image.

10. The computer-implemented method of claim 5, wherein identifying the first image comprises:
capturing the first image by the at least one imaging device at a first shutter speed or with a first focal ratio; and
applying a first gain to the first image by at least one processor of the at least one imaging device,
wherein configuring the at least one imaging device comprises:
calculating an exposure value for the first image based at least in part on at least one of the first shutter speed, the first ratio or the first gain; and
configuring the at least one imaging device based at least in part on the exposure value.

11. The computer-implemented method of claim 5, wherein performing the intensity analysis comprises:
calculating at least one histogram of at least the portion of the first image; and
configuring the at least one imaging device based at least in part on the at least one histogram and the information regarding the at least one of the second position or the second orientation.

12. The computer-implemented method of claim 5, wherein the at least one imaging device is aligned along or parallel to a roll axis of the aerial vehicle, and
wherein the field of view of the at least one imaging device extends forward of the aerial vehicle.

13. The computer-implemented method of claim 5, wherein determining the information regarding the at least one of the second position or the second orientation comprises:
generating, by a control system aboard the aerial vehicle, at least one instruction for causing the aerial vehicle to turn in a selected direction from the first orientation to the second orientation; and selecting the portion of the first image based at least in part on the selected direction, wherein the portion of the first image is on a side of the first image corresponding to the selected direction.

14. The computer-implemented method of claim 5, wherein the at least one imaging device is aligned along or parallel to a yaw axis of the aerial vehicle, and wherein the field of view of the at least one imaging device extends below the aerial vehicle.

15. The computer-implemented method of claim 5, wherein the first position is at a first altitude, wherein the second position is at a second altitude, wherein the first altitude is greater than the second altitude, and wherein determining the information regarding the at least one of the second position or the second orientation comprises:

generating, by a control system aboard the aerial vehicle, at least one instruction for causing the aerial vehicle to travel from the first position to the second position; and selecting a portion of the first image in a center of the first image based at least in part on the at least one instruction, wherein the first portion of the first image is the selected portion.

16. A computer-implemented method comprising:

identifying a first image captured at a first time by at least one imaging device provided aboard an aerial vehicle, wherein the aerial vehicle is in at least one of a first position or a first orientation at the first time, and wherein the first position is at a first altitude;

determining information regarding at least one of a second position or a second orientation of the aerial vehicle, wherein the second position is at a second altitude, and wherein the second altitude is greater than the first altitude;

generating, by a control system aboard the aerial vehicle, at least one instruction for causing the aerial vehicle to travel from the first position to the second position; and selecting a portion of the first image about a perimeter of the first image based at least in part on the at least one instruction;

configuring the at least one imaging device based at least in part on the selected portion of the first image and the information regarding the at least one of the second position or the second orientation;

causing the aerial vehicle to be in at least one of the second position or the second orientation at or prior to a second time; and capturing a second image by the at least one imaging device at the second time.

17. The computer-implemented method of claim 16, wherein determining the information regarding the at least one of the second position or the second orientation of the aerial vehicle comprises:

transmitting, by the control system, the at least one instruction to at least one processor unit associated with the at least one imaging device, wherein the information regarding the at least one of the second position or the second orientation is determined by at least one processor unit associated with the at least one imaging device based at least in part on the at least one instruction.

18. A computer-implemented method comprising:

identifying a first image captured at a first time by a first imaging device provided aboard an aerial vehicle, wherein the aerial vehicle is in at least one of a first position or a first orientation at the first time, and wherein the first imaging device has a first field of view;

determining information regarding at least one of a second position or a second orientation of the aerial vehicle;

selecting a portion of the first image based on the at least one of the second position or the second orientation;

determining that the at least one object depicted within the portion of the first image will be within a second field of view of a second imaging device provided aboard the aerial vehicle;

configuring the second imaging device based at least in part on the selected portion of the first image and the information regarding the at least one of the second position or the second orientation;

causing the aerial vehicle to be in at least one of the second position or the second orientation at or prior to a second time; and capturing a second image by the second imaging device at the second time.

19. A system comprising:

a first imaging device mounted to a structure, wherein the first imaging device comprises a first sensor, a first lens and a first field of view aligned oriented about a first axis;

a second imaging device mounted to the structure, wherein the second imaging device comprises a second sensor, a second lens and a second field of view oriented about a second axis; and a processing unit in communication with each of the first imaging device and the second imaging device, wherein the processing unit is configured to execute one or more instructions for performing a message comprising:

causing the first imaging device to capture a first image at a first time, wherein the first imaging device captured at least the first image at a first shutter speed, first aperture setting, first gain or first exposure value;

determining that a first subset of pixels of the first image will appear within the second field of view at a second time;

generating a histogram for at least a portion of the first subset of pixels;

selecting a second shutter speed for the second imaging device based at least in part on the histogram for the portion of the first subset of pixels; and causing the second imaging device to capture a second image at the second time, wherein the second imaging device captured at least the second image at the second shutter speed.

20. The system of claim 19, wherein the structure is a frame of an aerial vehicle, wherein the first axis is parallel to or along a roll axis of the aerial vehicle, and wherein the second axis is parallel to or along a yaw axis of the aerial vehicle.

* * * * *